United States Patent
Yamada

(10) Patent No.: US 11,496,507 B2
(45) Date of Patent: Nov. 8, 2022

(54) ABNORMALITY DETECTION DEVICE, ABNORMALITY DETECTION METHOD AND ABNORMALITY DETECTION PROGRAM

(71) Applicant: NEC CORPORATION, Tokyo (JP)

(72) Inventor: Yoshiyuki Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 551 days.

(21) Appl. No.: 16/491,892

(22) PCT Filed: Mar. 9, 2017

(86) PCT No.: PCT/JP2017/009406
§ 371 (c)(1),
(2) Date: Sep. 6, 2019

(87) PCT Pub. No.: WO2018/163342
PCT Pub. Date: Sep. 13, 2018

(65) Prior Publication Data
US 2020/0036745 A1  Jan. 30, 2020

(51) Int. Cl.
*G06N 5/04* (2006.01)
*H04L 29/06* (2006.01)
(Continued)

(52) U.S. Cl.
CPC ...... *H04L 63/1441* (2013.01); *G06F 16/2228* (2019.01); *G06N 5/04* (2013.01); *G06N 20/00* (2019.01)

(58) Field of Classification Search
CPC ............... H04L 63/1441; H04L 63/145; H04L 63/1466; H04L 63/1416; G06N 20/00; G06N 7/00; G06N 5/04; G06F 16/2228
See application file for complete search history.

(56) References Cited

U.S. PATENT DOCUMENTS

| 5,905,861 A * | 5/1999 | Lovell ...................... G06F 21/85 726/16 |
| 7,779,394 B2 * | 8/2010 | Homing .................. G06F 21/14 717/136 |

(Continued)

FOREIGN PATENT DOCUMENTS

| JP | 2006-522396 A | 9/2006 |
| JP | 2008-141641 A | 6/2008 |

(Continued)

OTHER PUBLICATIONS

"Algorithm B," [online], Department of Computer Science at Tsuda University, Computer Science Nitta Lab. at Graduate school of Tsuda University, [searched on Jan. 31, 2017], Internet <http://nw.tsuda.ac.jp/class/algoB/c13.html>, 13 pages.

(Continued)

*Primary Examiner* — Hosuk Song
(74) *Attorney, Agent, or Firm* — Sughrue Mion, PLLC

(57) ABSTRACT

An abnormality detection device 10, which detects an abnormality of a data series to be detected that has regularity in a sequence of data forming the data series, is provided with: a determination unit 11 which refers to a data series of a normal model composed of a prescribed permutation as a data series that indicates a state in which a system to be detected is normal, and which, every time one piece of data is input, in light of a permutation indicated by a pair of the one piece of input data and another piece of data input immediately before the one piece of data is input, determines that the data series to be detected is locally abnormal when the permutation is not included in the normal model, and determines that the data series to be detected is locally normal when the permutation is included in the normal model.

20 Claims, 19 Drawing Sheets

(51) Int. Cl.
   *H04L 9/40*   (2022.01)
   *G06N 20/00*  (2019.01)
   *G06F 16/22*  (2019.01)

(56) References Cited

U.S. PATENT DOCUMENTS

| | | | | |
|---|---|---|---|---|
| 8,732,859 B2 * | 5/2014 | Hlavac | ................ | H04L 41/28 |
| | | | | 713/172 |
| 8,788,804 B2 * | 7/2014 | Nagaraja | ............... | H04L 63/105 |
| | | | | 726/1 |
| 8,850,232 B2 * | 9/2014 | Priel | ................ | G06F 21/86 |
| | | | | 713/193 |
| 8,874,938 B2 * | 10/2014 | Matsushima | ........... | G06F 21/74 |
| | | | | 713/173 |
| 8,913,739 B2 * | 12/2014 | Golic | ................ | G06F 7/725 |
| | | | | 713/189 |
| 8,984,628 B2 * | 3/2015 | Mahaffey | ............. | H04W 12/128 |
| | | | | 713/188 |
| 9,853,997 B2 * | 12/2017 | Canzanese, Jr. | ........ | G06F 21/55 |
| 10,728,265 B2 * | 7/2020 | Hayden | ................. | G06F 21/552 |
| 10,964,416 B1 * | 3/2021 | Stack | ................... | G06Q 10/103 |

FOREIGN PATENT DOCUMENTS

| | | |
|---|---|---|
| JP | 2010-009296 A | 1/2010 |
| JP | 4822280 B2 | 11/2011 |
| JP | 5501481 B2 | 5/2014 |
| WO | 2016/132717 A1 | 8/2016 |

OTHER PUBLICATIONS

International Search Report for PCT/JP2017/009406 dated Jun. 6, 2017 [PCT/ISA/210].

* cited by examiner

FIG. 12
<FALSIFICATION>
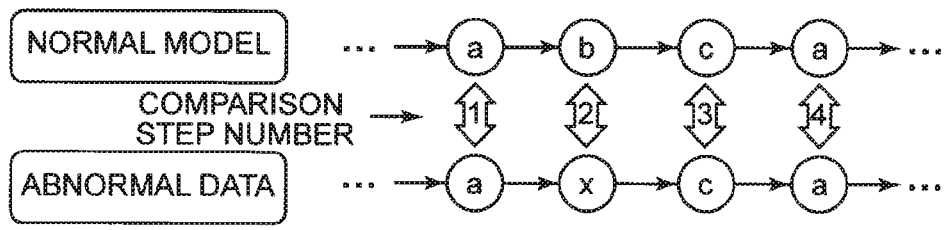
DISTANCE ARRAY
|   |      | a | x | c | a |
|---|------|---|---|---|---|
|   | 0(1) | 1 | 2 | 3 | 4 |
| a | 1    | 0(2) | 1 | 2 | 3 |
| b | 2    | 1 | 1(3) | 2 | 3 |
| c | 3    | 2 | 2 | 1(4) | 2 |
| a | 4    | 3 | 3 | 2 | 1(5) |
OPERATION HISTORY ARRAY
(OPERATION AT DECISION OF MINIMUM DISTANCE)
|   |      | a | x | c | a |
|---|------|---|---|---|---|
|   | -(1) | I | I | I | I |
| a | D    | M(2) | I | I | I |
| b | D    | D | S(3) | I | I |
| c | D    | D | D | M(4) | I |
| a | D    | D | D | D | M(5) |
M = MATCH, S = SUBSTITUTION,
I = INSERTION, D = DELETION
EDIT DISTANCE : 1
OPERATION    : ONE-TIME SUBSTITUTION

<DELETION>

EDIT DISTANCE : 2
OPERATION : ONE-TIME DELETION (IN THE MIDDLE), ONE-TIME INSERTION (AT THE END)

M = MATCH, S = SUBSTITUTION, I = INSERTION, D = DELETION

FIG. 15

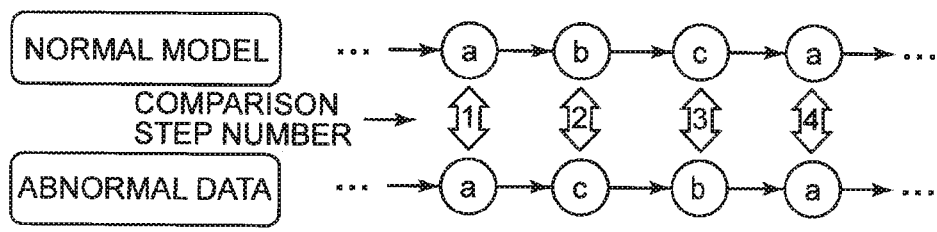

<ORDER CHANGE>

NORMAL MODEL ··· → a → b → c → a → ···

COMPARISON STEP NUMBER → ⇕1 ⇕2 ⇕3 ⇕4

ABNORMAL DATA ··· → a → c → b → a → ···

DISTANCE ARRAY

|   |   | a | c | b | a |
|---|---|---|---|---|---|
|   | $0_{(1)}$ | 1 | 2 | 3 | 4 |
| a | 1 | $0_{(2)}$ | $1_{(3)}$ | 2 | 3 |
| b | 2 | $1_{(3)}$ | $1_{(3)}$ | $1_{(4)}$ | 2 |
| c | 3 | 2 | $1_{(4)}$ | $2_{(4/5)}$ | 2 |
| a | 4 | 3 | 2 | 2 | $2_{(5/6)}$ |

OPERATION HISTORY ARRAY
(OPERATION AT DECISION OF MINIMUM DISTANCE)

|   |   | a | c | b | a |
|---|---|---|---|---|---|
|   | $-_{(1)}$ | I | I | I | I |
| a | D | $M_{(2)}$ | $I_{(3)}$ | I | I |
| b | D | $D_{(3)}$ | $S_{(3)}$ | $M_{(4)}$ | I |
| c | D | D | $M_{(4)}$ | $SID_{(4/5)}$ | S |
| a | D | D | D | S | $M_{(5/6)}$ |

M = MATCH, S = SUBSTITUTION,
I = INSERTION, D = DELETION

EDIT DISTANCE : 2
OPERATION : TWO-TIME SUBSTITUTION OR
ONE-TIME INSERTION,
ONE-TIME DELETION

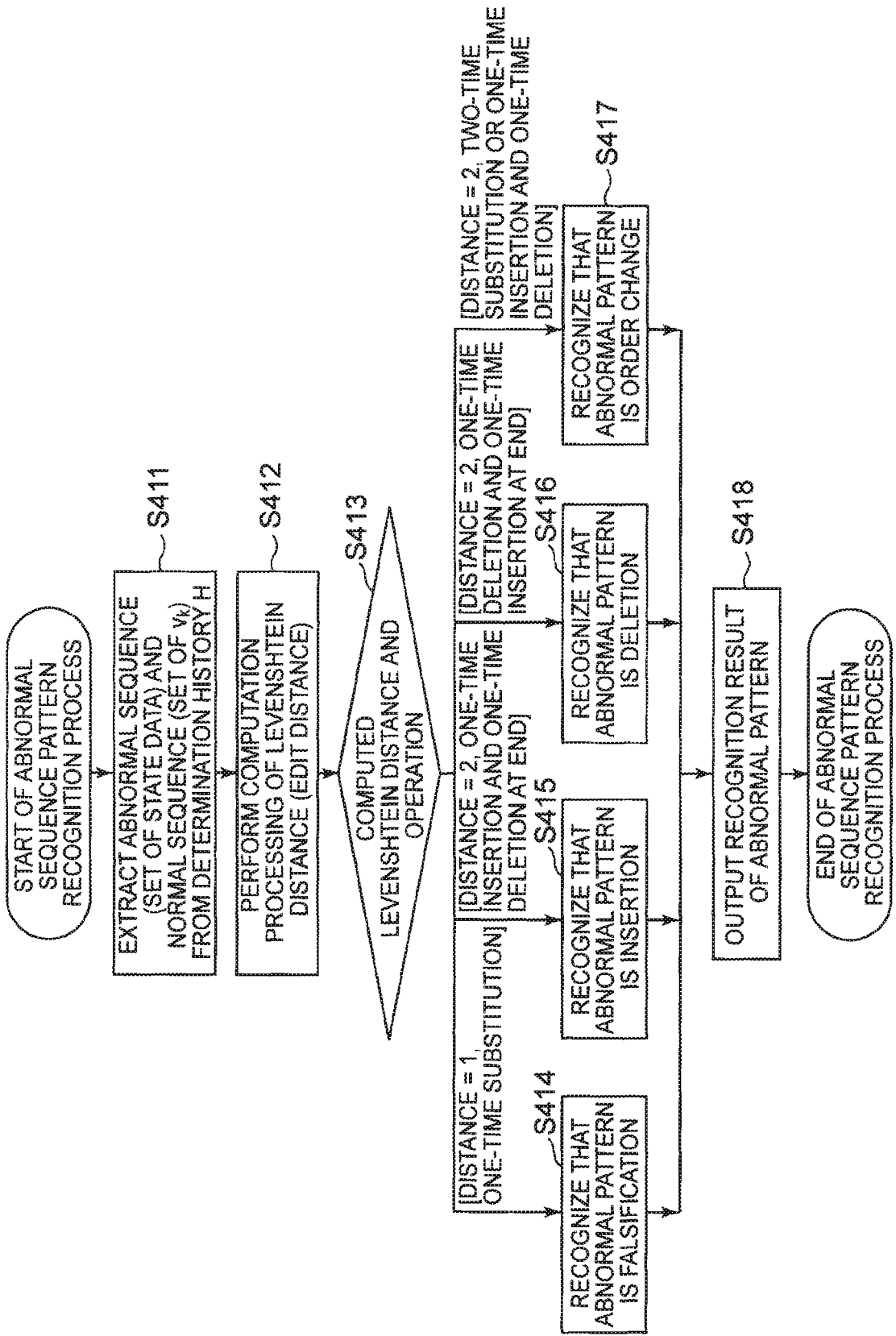

FIG. 18

| SEQUENCE NUMBER | TIME | SOURCE ADDRESS | DESTINATION ADDRESS | X COORDINATE | Y COORDINATE | Z COORDINATE | TEMPERATURE |
|---|---|---|---|---|---|---|---|
| 1 | 16:32:10 | X | Y | 0 | 0 | 0 | 20 |
| 2 | 16:32:11 | X | Y | 50 | 0 | 0 | 20 |
| 3 | 16:32:12 | X | Y | 50 | 50 | 0 | 21 |
| 4 | 16:32:13 | X | Y | 50 | 50 | 50 | 21 |
| 5 | 16:32:15 | X | Y | -50 | -50 | 50 | 22 |
| 6 | 16:32:16 | X | Y | -50 | -50 | 0 | 22 |
| 7 | 16:32:17 | X | Y | -50 | 0 | 0 | 21 |
| 8 | 16:32:18 | X | Y | 0 | 0 | 0 | 20 |

ABNORMALITY DETECTION DEVICE, ABNORMALITY DETECTION METHOD AND ABNORMALITY DETECTION PROGRAM

CROSS REFERENCE TO RELATED APPLICATIONS

This application is a National Stage of International Application No. PCT/JP2017/009406, filed on Mar. 9, 2017.

TECHNICAL FIELD

The present invention relates to an abnormality detection device, an abnormality detection method, and an abnormality detection program.

BACKGROUND ART

There have been increased occurrences of security incidents classified into a serious accident category such as hacks into an industrial control system, a physical system, or the like. Hacks into systems caused incidents having significant influence such as an explosion of an oil pipeline, a destruction of a centrifugal separator of a nuclear facility, and the like. To prevent occurrences of the incidents, it is required to detect attacks on systems in advance.

Due to advanced attack methods, however, there are attack patterns difficult to be detected. To enable to cope even with the attack patterns difficult to be detected, development of an advanced abnormality detection method is required. Patent Literatures (PTLs) 1 to 3 describe examples of the abnormality detection method.

PTL 1 describes a moving body behavior analysis device that analyzes position time series data by using a hidden Markov model with the aim of identification or abnormality determination of a behavior pattern of a moving body such as a person, a vehicle, or the like. The position time series data includes, for example, an ID, time data, and coordinate information.

The hidden Markov model is a model of estimating a parameter of a Markov process from observable information assuming that the system is in a Markov process with an unknown parameter.

Specifically, the hidden Markov model is a probabilistic model used to estimate a state transition inside a system on the basis of an appearance probability distribution of a symbol in the case of assuming that the system has an internal state in which the system transitions according to a Markov process and considering that a symbol corresponding to each state is probabilistically output.

The moving body behavior analysis device described in PTL 1 detects an abnormal behavior on the basis of the degree of similarity computed by comparing between the model corresponding to the data of a normal pattern and a model corresponding to data to be detected.

PTL 2 describes a method of detecting abnormality in an industrial control system (ICS). The method described in PTL 2 is used to detect abnormality by collecting measurement data from a plurality of targets in a system and computing an abnormality level or an abnormality score with the entire system classified into types or hierarchies of devices.

In the method described in PTL 2, it is thought that Hotelling $T^2$ test, One-class SVM, Local Outlier Factor, or the like is used for numerical data, as an arithmetic algorithm for obtaining an abnormality score. In addition, it is thought that infrequent pattern discovery, naive Bayes, hidden Markov model, or the like technique is adopted for event data.

Furthermore, PTL 3 describes a log analysis system capable of identifying and analyzing a failure that has occurred in an information processing system with high accuracy.

CITATION LIST

Patent Literature

PTL 1: Japanese Patent No. 4822280
PTL 2: Japanese Patent No. 5501481
PTL 3: WO 2016/132717

Non Patent Literature

NPL 1: "Algorithm B," [online], Department of Computer Science at Tsuda University, Computer Science Nitta Lab. at Graduate school of Tsuda University, [searched on Jan. 31, 2017], Internet <http://nw.tsuda.ac.jp/class/algoB/c13.html>

SUMMARY OF INVENTION

Technical Problem

Abnormality detection methods include detection methods based on detection of statistical outliers that do not determine as an attack if a form or value of a control parameter or observation data is within a normal range, for example. The detection methods based on detection of statistical outliers are not able to immediately detect abnormality in the order of appearance of data, abnormality in the timing when data appears, or the like.

Hereinafter, information to be processed of an abnormality detection method will be referred to as "control sequence." The control sequence is a data group having regularity in a sequence of the included data. The control sequence is, for example, a set of control commands issued in a physical system. The regularity in the control sequence may be periodic regularity.

Moreover, the control sequence is similar data to the position time series data described in PTL 1. In other words, the control sequence corresponds to data that appears in a system in which a change with a prescribed state transition occurs.

FIG. 18 is an explanatory diagram showing an example of the control sequence. Respective pieces of data constituting the control sequence shown in FIG. 18 will be referred to as "state data." FIG. 18 shows eight pieces of state data.

The control sequence shown in FIG. 18 is data obtained in a system that controls the actions of a robot arm by issuing a command for each step in a form of specifying the coordinates in a three-dimensional space. In the above system, commands are issued at prescribed time intervals from a personal computer (PC) having a source address X to a robot arm having a destination address Y.

It is required to perform abnormality determination when an element (state data) of a control sequence appears or when the element is observed in order to implement the execution of immediate abnormality detection. As a simple method of performing the above abnormality determination, there could be a method of comparing or collating state data corresponding to a normal model expected to be subsequently input with observed state data one by one.

Since a deviation occurs in the order of appearance of both state data under specific conditions, however, it is difficult to perform immediate abnormality detection by using a method of simply comparing state data one by one at any time. FIG. 19 shows an example that a deviation occurs in the order of appearance of both state data under specific conditions, which makes it difficult to perform immediate abnormality detection.

FIG. 19 is an explanatory diagram showing an example of a method of performing abnormality determination. In FIG. 19, there are shown a normal model, first observation data, and second observation data. The first observation data and the second observation data are two exemplified independent control sequences. Moreover, the numerical value in a circle shown in FIG. 19 corresponds to a state of the inside of a system to be detected.

Generally it is impossible to acquire information on the system to be detected until before the abnormality detection system starts up, and therefore it is difficult to grasp the state of the system to be detected just before the startup thereof. In other words, it is difficult to grasp the current position of a series of state data with a state transition immediately after the abnormality detection system has started up. Therefore, the abnormality detection system is not able to easily decide the state data as a target of the first comparison for a normal model.

In the first observation data shown in FIG. 19, several pieces of state data are lined according to the normal model. The abnormality detection system, however, decides that the state data to be compared with the normal model is not state data indicating state value "3," but state data indicating state value "1." In other words, the abnormality detection system perceives the current state of the target system as "3."

In the example shown in FIG. 19, the position of the normal model deviates from an appropriate position in comparison between the first observation data and state data. Since the position of the normal model deviates from the appropriate position thereof in comparison, all state data of the first observation data are determined to be "NG" as a determination result as shown in FIG. 19.

As described above, it is difficult to grasp to which position of the normal model each state data of the control sequence corresponds only by comparison of data of one state. Particularly, in the case where a periodic control sequence is to be processed, it is difficult to grasp to which position of the normal model each state data corresponds only by comparison of data of one state.

To solve the above problem, it is conceivable to manually synchronize the startup of the system to be detected and the startup of the abnormality detection system. If both startups can be synchronized, a positional displacement does not occur. Considering the possibility of an increase in target systems, a risk of work errors, and the like, manual handling is undesirable.

Furthermore, after detecting abnormality caused by a deviation from the normal model, the abnormality detection system is not able to decide the state data of the first comparison target of the normal model after the abnormality detection, which may cause a positional displacement in some cases. In the case of determining the second observation data shown in FIG. 19, the abnormality detection system detects that the second observation data is abnormal since state data "x" does not correspond to any state of the normal model at the input of the state data "x."

In the second observation data shown in FIG. 19, the state data "x" is followed by state data as in the normal model. The abnormality detection system perceives the current state of the normal model after detecting abnormality not as "3" but as "4," which is the next state observed when the abnormality does not occur, and therefore the second observation data deviates from the state data of the normal model appropriate for the comparison with the state data of the next state to which the second observation data corresponds.

Due to the deviation of the state data of the normal model appropriate for comparison, the determination results of all state data are "NG" after the state data "x" of the second observation data as shown in FIG. 19.

In order to cope with the positional displacement as described above, it is also conceivable to adjust the position of state data to be compared after the abnormality detection.

Moreover, to compare the normal model with the abnormal data appropriately, the abnormality detection system is required to previously grasp the comparison method according to each pattern of abnormal data.

FIG. 20 is an explanatory diagram showing an example of a method of comparing the normal model with the normal data. A comparison step number in a double-ended arrow shown in FIG. 20 represents the number in the order of a comparison process to be performed. Furthermore, the double-ended arrow shown in FIG. 20 points at two pieces of state data to be compared in each comparison step number.

In the case of comparing between the normal model and the normal data, the abnormality detection system may compare the state data of the normal model with the state data of the normal data corresponding to the same position in each permutation one by one as shown in FIG. 20.

Hereinafter, the comparison method between the abnormal data and each pattern will be described. FIG. 21 is an explanatory diagram showing an example of a comparison method between a normal model and abnormal data.

The <falsification> shown in FIG. 21 represents a pattern in which a parameter in the normal control sequence has been rewritten, for example. In the comparison between the normal model and the abnormal data, the abnormality detection system may compare the state data of the abnormal data with the state data of the normal model in the same position as the state data of the normal model as shown in FIG. 21.

In the case where the abnormality detection system does not grasp the above comparison method or is not able to recognize that the pattern of the abnormal data corresponds to <falsification>, however, a positional displacement occurs.

The <insertion> shown in FIG. 21 represents a pattern in which invalid state data is inserted into somewhere in the normal control sequence, for example. In the comparison between the normal model and the abnormal data, the abnormality detection system may detect abnormality as in the comparison step number "3" shown in FIG. 21, thereupon may compare the state data of the normal model immediately previous in position to the state data of the abnormal data with the state data of the abnormal data.

In the case where the abnormality detection system does not grasp the above comparison method or is not able to recognize that the pattern of the abnormal data corresponds to <insertion>, however, a positional displacement occurs.

Moreover, in the case where one piece of state data is to be inserted, the abnormality detection system is able to cope by using the above comparison method. In the case where two or more pieces of state data are inserted, however, a positional displacement occurs if the abnormality detection system grasps only the above comparison method.

The <deletion> shown in FIG. 21 represents a pattern in which any state data in the normal control sequence is deleted, for example. In the comparison between the normal model and the abnormal data, the abnormality detection system may detect abnormality as in the comparison step number "3" shown in FIG. 21, thereupon may compare the state data of the normal model immediately subsequent in position to the state data of the abnormal data with the state data of the abnormal data.

In the case where the abnormality detection system does not grasp the above comparison method or is not able to recognize that the pattern of the abnormal data corresponds to <deletion>, however, a positional displacement occurs.

Moreover, in the case where one piece of state data is to be deleted, the abnormality detection system is able to cope by using the above comparison method. In the case where two or more pieces of state data are deleted, however, a positional displacement occurs if the abnormality detection system grasps only the above comparison method.

The <order change> shown in FIG. 21 represents a pattern in which state data in the normal control sequence is substituted with another state data in the normal control sequence, for example. In the comparison between the normal model and the abnormal data, the abnormality detection system may compare the state data of the abnormal data in the same position as the state data of the normal model with the state data of the normal model, as shown in FIG. 21.

In the case where the abnormality detection system does not grasp the above comparison method or is not able to recognize that the pattern of the abnormal data corresponds to <order change>, however, a positional displacement occurs.

It is required to provide an abnormality detection system capable of recognizing abnormal patterns on the basis of abnormal data so as to be able to cope with the respective abnormal patterns.

The moving body behavior analysis device described in PTL 1 is able to compute the degree of similarity only when all of the series of position time series data have been acquired. Furthermore, the log analysis system described in PTL 3 detects abnormality by collectively comparing a plurality of logs in series constituting a sequence relationship.

Specifically, the moving body behavior analysis device described in PTL 1 and the log analysis system described in PTL 3 are not able to sequentially detect the presence or absence of abnormality and not able to perform immediate abnormality detection like detecting abnormality upon an occurrence of deviation from the normal model.

To implement the execution of immediate abnormality detection, it is required to determine whether or not an element of position time series data is abnormal every time the element appears. PTL 1 and PTL 3 do not describe a method of performing the immediate abnormality detection.

Furthermore, in the case where the method described in PTL 2 is used, an arithmetic algorithm adoptable to numerical data uses a technique based on detection of statistical outliers and therefore consideration is not made on an influence of the sequence relationship among the characteristics of ICS data.

Furthermore, particularly a hidden Markov model among arithmetic algorithms adoptable to event data is able to consider the influence of the sequence relationship. PTL 2, however, does not describe a concrete method of applying the hidden Markov model to a computation method or the like of an abnormality score.

OBJECT OF THE INVENTION

Therefore, an object of the present invention is to provide an abnormality detection device, an abnormality detection method, and an abnormality detection program capable of immediately detecting whether or not the permutation of the state data included in a control sequence deviates from the normal model to solve the above problem.

Solution to Problem

According to the present invention, there is provided an abnormality detection device, which detects an abnormality of a data series to be detected that has regularity in a sequence of data forming the data series, the abnormality detection device characterized by including: a determination unit which refers to a data series of a normal model composed of a prescribed permutation as a data series that indicates a state in which a system to be detected is normal, and which, every time one piece of data is input, in light of a permutation indicated by a pair of the one piece of input data and another piece of data input immediately before the one piece of data is input, determines that the data series to be detected is locally abnormal when the permutation is not included in the normal model, and determines that the data series to be detected is locally normal when the permutation is included in the normal model; and a data candidate holding unit which holds at least one or more data candidates of the normal model, which are predicted to be subsequently input to the determination unit, when the determination unit determines that the data series to be detected is locally normal.

According to the present invention, there is provided an abnormality detection method, which is used to detect an abnormality of a data series to be detected that has regularity in a sequence of data forming the data series, the abnormality detection method characterized by including the steps of: referring to a data series of a normal model composed of a prescribed permutation as a data series that indicates a state in which a system to be detected is normal, and every time one piece of data is input, in light of a permutation indicated by a pair of the one piece of input data and another piece of data input immediately before the one piece of data is input, determining that the data series to be detected is locally abnormal when the permutation is not included in the normal model, and determining that the data series to be detected is locally normal when the permutation is included in the normal model; and holding at least one or more data candidates of the normal model, which are predicted to be subsequently input, when the data series to be detected is determined to be locally normal.

According to the present invention, there is provided an abnormality detection program, which is used to detect an abnormality of a data series to be detected that has regularity in a sequence of data forming the data series, the abnormality detection program characterized by causing a computer to perform: a determination process of referring to a data series of a normal model composed of a prescribed permutation as a data series that indicates a state in which a system to be detected is normal, and every time one piece of data is input, in light of a permutation indicated by a pair of the one piece of input data and another piece of data input immediately before the one piece of data is input, determining that the data series to be detected is locally abnormal when the permutation is not included in the normal model, and determining that the data series to be detected is locally normal when the permutation is included in the normal model; and a holding process of holding at least one or more data candidates of the normal model, which are predicted to be subsequently input, when the data series to be detected is determined to be locally normal.

Advantageous Effects of Invention

The present invention enables immediate detection of whether or not the permutation of state data included in a control sequence deviates from a normal model.

BRIEF DESCRIPTION OF DRAWINGS

FIG. 12 is an explanatory diagram showing an example of Levenshtein distance computation performed by an abnormal sequence pattern recognition unit 170.

FIG. 15 is an explanatory diagram showing further another example of Levenshtein distance computation performed by the abnormal sequence pattern recognition unit 170.

FIG. 16 is a flowchart showing a concrete action of an abnormal sequence pattern recognition process performed by the abnormal sequence pattern recognition unit 170 of a third exemplary embodiment.

FIG. 18 is an explanatory diagram showing an example of a control sequence.

DESCRIPTION OF EMBODIMENT

Figure 1:
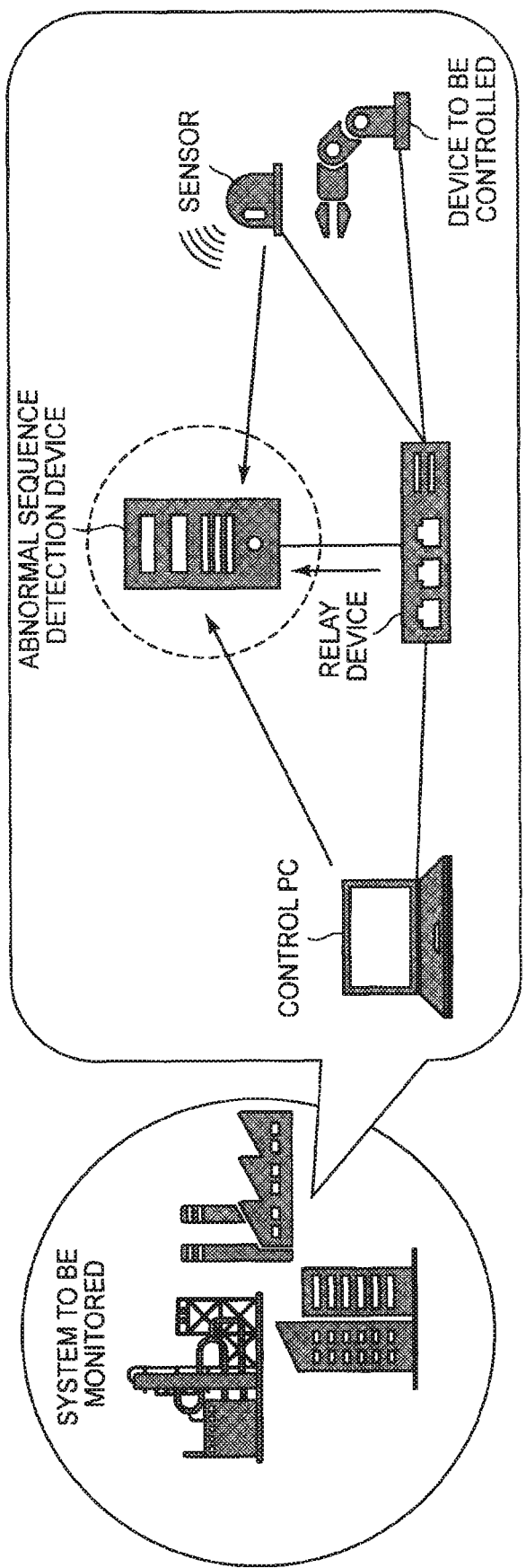
FIG. 1 is an explanatory diagram showing an example of use of an abnormal sequence detection device according to the present invention.

FIG. 1 is an explanatory diagram showing an example of use of an abnormal sequence detection device according to the present invention. As shown in FIG. 1, the abnormal sequence detection device is communicably connected to a control PC, a relay device, and a sensor. Moreover, the relay device is communicably connected to a control PC, a sensor, and a device to be controlled.

Furthermore, as shown in FIG. 1, the abnormal sequence detection device and the like in a balloon are running within a system to be monitored. The system to be monitored is, for example, an industrial control system. Incidentally, the system to be monitored is not limited to the industrial control system.

The abnormal sequence detection device acquires a control sequence, which is information based on a state transition of a system to be monitored, from a control PC, a relay device, and a sensor. The type of information to be acquired includes, for example, a control command, sensor information, and various logs.

In addition, the abnormal sequence detection device may acquire a control sequence by capturing a packet in a communication network. Furthermore, the abnormal sequence detection device may acquire a control sequence on the basis of a log stored in each device. Further, the abnormal sequence detection device may acquire a control sequence on the basis of information acquired by an agent of a device to be monitored.

The abnormal sequence detection device according to the present invention is a device that detects abnormality in a control sequence. Specifically, the abnormal sequence detection device determines whether the sequence of the included state data is normal or abnormal in abnormality detection of the control sequence. Furthermore, the abnormal sequence detection device recognizes a pattern of the detected abnormality. Hereinafter, exemplary embodiments of the present invention will be described with reference to appended drawings.

First Exemplary Embodiment

[Description of the Configuration]

Figure 2:
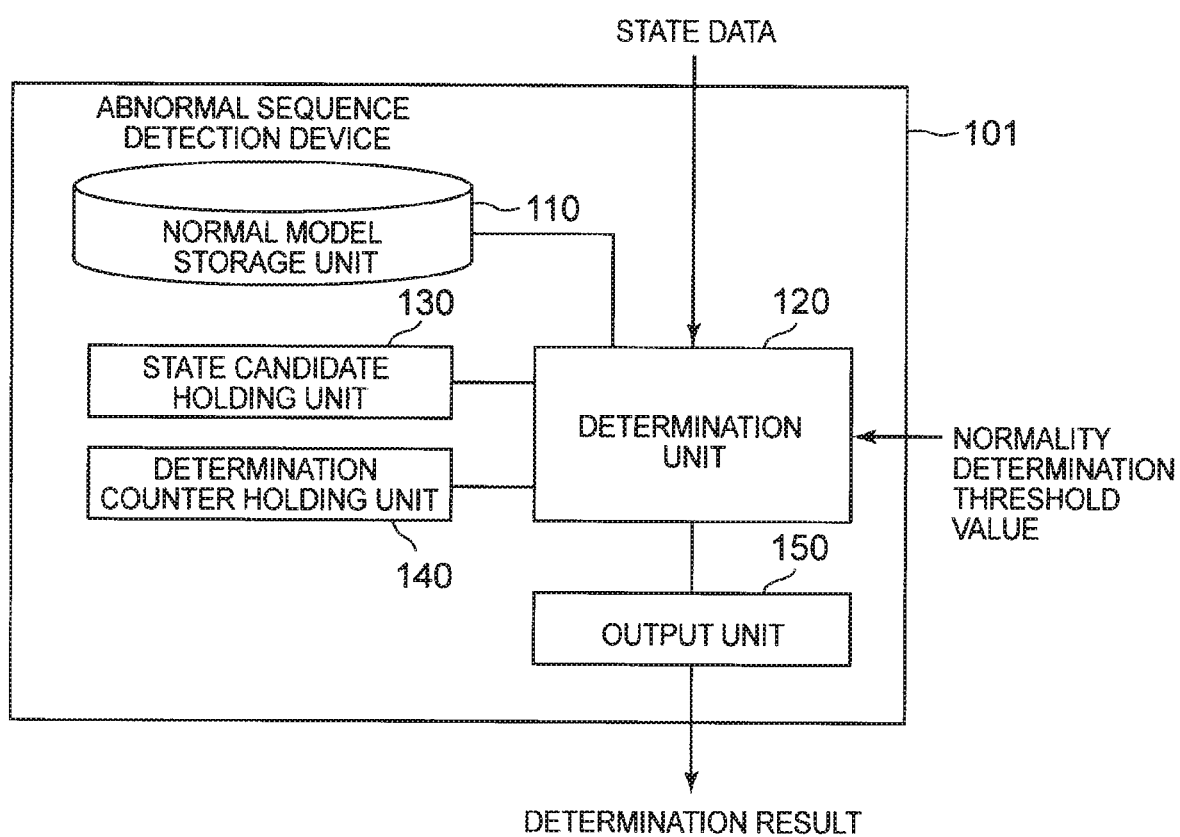
FIG. 2 is a block diagram showing a configuration example of a first exemplary embodiment of an abnormal sequence detection device 101 according to the present invention.

FIG. 2 is a block diagram showing a configuration example of a first exemplary embodiment of an abnormal sequence detection device 101 according to the present invention. The abnormal sequence detection device 101 of this exemplary embodiment corresponds to an abnormality detection device.

As shown in FIG. 2, the abnormal sequence detection device 101 includes a normal model storage unit 110, a determination unit 120, a state candidate holding unit 130, a determination counter holding unit 140, and an output unit 150.

The abnormal sequence detection device 101 of this exemplary embodiment has a function of determining whether the sequence of data is normal or abnormal with respect to a data series that has regularity in the sequence of data forming the data series. While state data is observed in a correct sequence continuously by a specified number of pieces of state data, which is specified as a normality determination threshold value, the abnormal sequence detection device 101 determines a control sequence including the pieces of state data as "normal."

The normal model storage unit 110 has a function of storing a normal model used for abnormality detection of the control sequence. The normal model may be constructed within the abnormal sequence detection device 101 or may be input from outside.

The state data constituting the control sequence, which is a target of detection by the abnormal sequence detection device 101 of this exemplary embodiment, is a multi-dimensional vector composed of, for example, arbitrary actual values, discrete values, or the like. The control sequence has regularity periodic, for example, in the order of appearance of the multi-dimensional vectors. The multi-dimensional vector is associated with the internal state of the normal model.

If the control sequence having the above characteristics is a target of detection, the normal model used for abnormality detection is represented by a directed graph. In addition, the normal model may be extracted by applying a hidden Markov model or the like to state data of the control sequence.

The determination unit 120 has a function of determining a control sequence including a specified arbitrary number of pieces of state data as "normal" while the state data is observed in a correct sequence continuously. Additionally, the determination unit 120 has a function of determining the control sequence as "abnormal" at the time of input of state data in a different sequence in the case where even one piece of state data is observed in a different sequence from the sequence of the normal model.

The determination unit 120 compares and collate the observation data with the normal model. To perform the comparison and collation, the determination unit 120 sequentially searches for elements constituting the normal model.

As shown in FIG. 2, the determination unit 120 receives inputs of state data and a normality determination threshold value. The normality determination threshold value corresponds to the aforementioned specified arbitrary number and it can also be said that the normality determination threshold value is a threshold value of the determination history number until normality determination is obtained. The normality determination threshold value is a parameter of the abnormal sequence detection device 101, for example. The normality determination threshold value may be a parameter decided independently of the normal model to be used or may be a parameter dependent on the normal model to be used.

The threshold value of the determination history number affecting normality determination depends on the control system to be processed. In other words, the normality determination threshold value is required to be a parameter that can be set to an arbitrary number. For example, the normality determination threshold value may be described as a set value to the abnormal sequence detection device 101 in the manual of the abnormality detection system, the procedure manual thereof, the specifications thereof, or the like.

Moreover, besides the input as a set value, the normality determination threshold value may be set on the basis of the presence or absence of a branch of a normal pattern in the normal model, transition probability, or the like in the normal model.

The state candidate holding unit 130 has a function of holding candidates for a state to be subsequently input to the determination unit 120. After the determination unit 120 determines that the order of one piece of input state data is normal, the state candidate holding unit 130 determines the candidates for the state to be subsequently input by using the normal model.

The candidate for a state to be subsequently input may be a candidate in the next current state in the normal model. Furthermore, as to the candidate in the next current state, there may be one or multiple candidates.

The determination counter holding unit 140 has a function of holding a determination counter for the input state data. The determination counter indicates the number of times that the determination unit 120 determined that the sequence of state data input continuously is normal.

The output unit 150 has a function of outputting a determination result of the determination unit 120, which indicates whether the control sequence is normal or abnormal.

[Description of Action]

Hereinafter, an action of the abnormal sequence detection device 101 shown in FIG. 2 will be described with reference to FIGS. 3 and 5.

Figure 3:
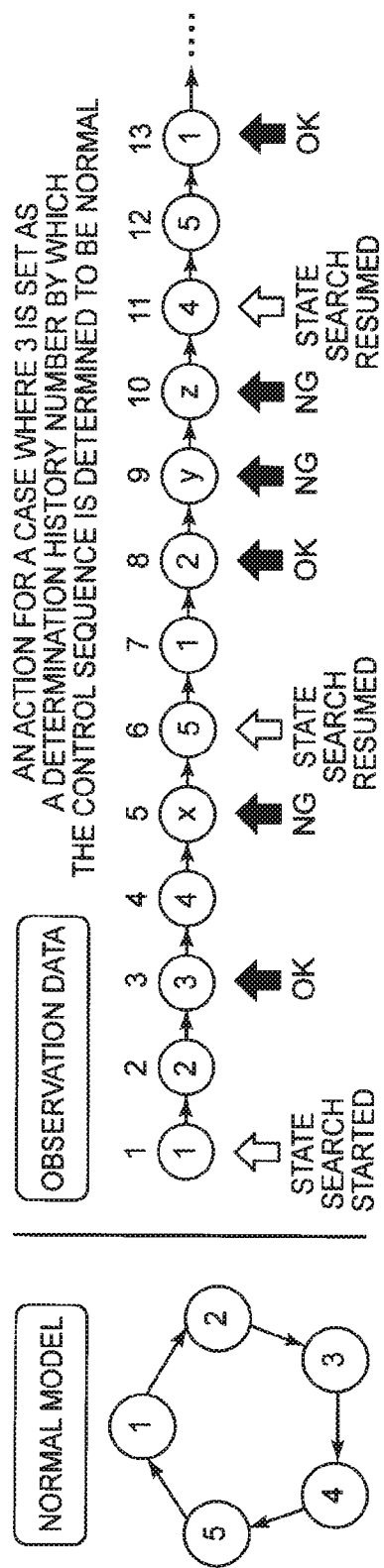
FIG. 3 is an explanatory diagram showing an outline of an action of a control sequence determination process performed by the abnormal sequence detection device 101 of the first exemplary embodiment.

First, description is made on the outline of an action of determining whether the control sequence is normal or abnormal in the abnormal sequence detection device 101 shown in FIG. 2, with reference to FIG. 3. FIG. 3 is an explanatory diagram showing an outline of an action of a control sequence determination process performed by the abnormal sequence detection device 101 of the first exemplary embodiment.

FIG. 3 shows a normal model to be used in a control sequence determination process and observation data, which is a target of the control sequence determination process. The normal model is represented by a directed graph. Furthermore, the normal model shown in FIG. 3 is a circular model.

The state data constituting the normal model is a multi-dimensional vector including, for example, arbitrary actual values and discrete values. A sequence number is given to each state data. Each state data is identified by the sequence number. In addition, a numerical value in a circle shown in FIG. 3 indicates a sequence number of the normal model to which the multi-dimensional vector corresponds.

In the control sequence determination process shown in FIG. 3, the determination history number by which the control sequence is determined to be normal is set to 3. The determination unit 120 starts determination from "1," which is observation data (state data) of the sequence number 1. Before starting the determination, the state candidate holding unit 130 holds initial candidates "1," "2," "3," "4," and "5" for the state to be input. The initial candidates for the input state are all elements of the normal model.

First, the observation data "1" is input to the determination unit 120. Since "1" is included in the candidates for the states held in the state candidate holding unit 130, the determination unit 120 determines that the observation data "1" is correct state data. At the time of determination by the determination unit 120, the state candidate holding unit 130 holds a state candidate "2" to be subsequently input. In addition, the determination counter holding unit 140 holds a determination counter "1."

Subsequently, the observation data "2" is input to the determination unit 120. Since "2" coincides with the state candidate held in the state candidate holding unit 130, the determination unit 120 determines that the number in the order of the input observation data "2" is normal. At the time when the determination unit 120 has made the determination, the state candidate holding unit 130 holds a state candidate "3" to be subsequently input. Furthermore, the determination counter holding unit 140 holds the value "2" of the determination counter.

Subsequently, the observation data "3" is input to the determination unit 120. The determination unit 120 determines that the number in the order of the input observation data "3" is normal. At the time of the determination by the determination unit 120, the determination counter "3" held by the determination counter holding unit 140 coincides with the normality determination threshold value, and therefore the output unit 150 outputs a determination result indicating that the control sequence is normal.

Subsequently, observation data "4" is input to the determination unit 120. The determination unit 120 determines that the number in the order of the input observation data "4" is normal. Since the determination counter "4" held by the determination counter holding unit 140 exceeds a normality determination threshold value at the time of determination by the determination unit 120, the output unit 150 outputs a determination result indicating that the control sequence is normal. In addition, the normal state is ongoing and therefore the output unit 150 may omit the output of the determination result.

Subsequently, observation data "x" is input to the determination unit 120. Since "x" does not coincide with the state candidate "5" held by the state candidate holding unit 130, the determination unit 120 determines that the input number in the order of the observation data "x" is abnormal. Subsequently, the output unit 150 outputs a determination result indicating that the control sequence is abnormal.

At the time of output of the determination result indicating that the control sequence is abnormal, the state candidate holding unit 130 holds input initial candidates "1," "2," "3," "4," and "5" for states again. Moreover, the determination counter held by the determination counter holding unit 140 is initialized to "0." After the initialization, the determination unit 120 restarts the determination from "5" of the sequence number 5, which is the next observation data.

Figure 4:
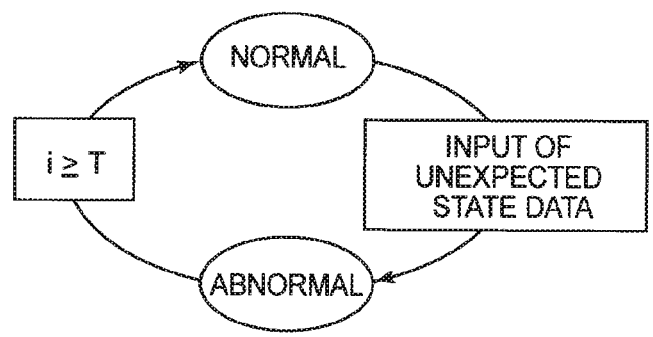
FIG. 4 is an explanatory diagram showing an example of a state transition of a determination result output from the abnormal sequence detection device 101.

The abnormal sequence detection device 101 repeatedly performs the above control sequence determination process until there are no more input observation data. FIG. 4 shows an example of a state transition of a determination result output from the abnormal sequence detection device 101 when the above control sequence determination process is performed.

FIG. 4 is an explanatory diagram showing an example of a state transition of a determination result output from the abnormal sequence detection device 101. In other words, in the case where the value of the determination counter i is equal to or greater than a normality determination threshold value T, the output determination result indicates "normal."

Furthermore, in the case where unexpected state data is input to the abnormal sequence detection device 101 when a determination result indicating "normal" is output, an output determination result indicates "abnormal." Moreover, in the case where the value of the determination counter i has reached again the normality determination threshold value T after the determination result indicating "abnormal" is output, an output determination result indicates "normal" again.

Subsequently, an action of the abnormal sequence detection device 101 shown in FIG. 2 for determining whether the control sequence is normal or abnormal is described with reference to FIG. 5. FIG. 5 is a flowchart showing an action of a control sequence determination process performed by the abnormal sequence detection device 101 of the first exemplary embodiment.

First, the abnormal sequence detection device 101 performs start processing composed of the processes of steps S101 to S104. The determination unit 120 acquires a normal model G=(V, A) from the normal model storage unit 110 (step S101).

The normal model G of this example is a model represented by a state transition diagram. V and A represent a set of nodes corresponding to elements constituting the normal model G and a set of links connecting nodes to each other, respectively, when the normal model G is considered to be a graph in the state transition diagram.

Furthermore, $a_l$, which is an element of the set A of links is a link connecting one node in the state transition diagram to another node therein. In other words, the link $a_l$ has information on a start point (node) and an end point (node). A function s and a function d are a function that returns a start node of a specified link and a function that returns an end node thereof, respectively. In other words, $s(a_l)$ is a start node of $a_l$ that coincides with any one of the elements of V. In addition, $d(a_l)$ is an end node of $a_l$ that coincides with any one of the elements of V. Further, $v_k$ is an element of the set V of nodes.

Subsequently, the determination unit 120 initializes the determination counter i held by the determination counter holding unit 140 to "0" (step S102). The determination unit 120 then acquires the normality determination threshold value T (step S103).

Subsequently, the determination unit 120 sets an initial state candidate in the input state candidate P held by the state candidate holding unit 130 (step S104). In the stage of the start processing, the initial state candidate is the set V of elements constituting a normal model and therefore P=V is set.

After the end of start processing, the abnormal sequence detection device 101 performs a search process for elements of the normal model G composed of processes of steps S105 to S114. The determination unit 120 acquires input state data x (step S105).

Subsequently, the determination unit 120 confirms whether $v_k \in P$ satisfying $f(x)==v_k$ is present (step S106). The function f(x) is a function that returns a node corresponding to state data having the number in the order that has been input.

Unless $v_k \in P$ is present (No in step S106), the determination unit 120 sets P held by the state candidate holding unit 130 to V again as an initial state candidate (step S107).

In the process of step S106, the determination unit 120 determines whether $v_k$ corresponding to the input state data is included in the state candidate P set on the basis of the immediately-previous state data (specifically, whether $v_k$ is a source of P). By the process of step S106, it is determined whether the permutation represented by a pair of one piece of input data and another piece of data input immediately before the one piece of data is input is included in the normal model every time one piece of data among a plurality of pieces of observation data is input.

Subsequently, the determination unit 120 initializes the determination counter i held by the determination counter holding unit 140 to "0" (step S108). The determination unit 120 prepares for performing the determination process from the beginning by making settings of P=V and i=0.

Subsequently, the output unit 150 outputs a determination result indicating that the control sequence is abnormal (step S109). After the output of the determination result, the determination unit 120 confirms whether to accept the next state data (step S114).

If the next state data is to be accepted (Yes in step S114), the determination unit 120 performs the process of step S105 again. Unless the next state data is to be accepted (No in step S114), the abnormal sequence detection device 101 ends the control sequence determination process.

If $v_k \in P$ is present (Yes in step S106), the determination unit 120 acquires a state candidate subsequently input (step S110). Character $s^{-1}$ is an inverse function of a function s representing the start node of the link. In other words, $s^{-1}(v_k)$ represents a link having $v_k$ as the start node. If $v_k$ is present, a link $a_l$ having $v_k$ as the start node is decided as $a_l$ satisfying $a_l = s^{-1}(v_k)$.

Furthermore, since the function d represents the end node of the link, $d(s^{-1}(v_k))$ represents the end node of a link having $v_k$ as the start node. In other words, if the link is decided, the end node corresponding to the start node is obtained by $d(s^{-1}(v_k))$. $d(s^{-1}(v_k))$ is a state candidate for the next comparison target.

If a plurality of links were extended from the start node, there exist as many links as the number of end nodes satisfying the above expression. In other words, the state data subsequently input is not always uniquely decided, and therefore the determination unit 120 acquires a state candidate subsequently input in the process of step S110.

Subsequently, the determination unit 120 increments by one the determination counter i held by the determination counter holding unit 140 (step S111). Subsequently, the determination unit 120 confirms whether or not the value of the determination counter i is equal to or greater than the normality determination threshold value T (step S112).

If the value of the determination counter i is less than the normality determination threshold value T (False in step S112), the determination unit 120 performs the process of step S114 described above.

If the value of the determination counter i is equal to or greater than the normality determination threshold value T (True in step S112), the output unit 150 outputs a determination result indicating that the control sequence is normal (step S113). After output of the determination result, the determination unit 120 performs the process of step S114 described above.

In the processes of steps S105 to S106, the determination unit 120 determines whether or not a pair of one piece of input data and another piece of data input immediately before the one piece of data is input is included in the normal model. Unless the pair is included in the normal model, the determination unit 120 determines that the system to be detected is placed in an abnormal state.

[Description of Advantageous Effects]

The abnormal sequence detection device 101 according to this exemplary embodiment is able to sequentially detect an abnormal state of a control sequence that has regularity in a sequence of included state data. The reason for that is because, every time one piece of state data is input, the determination unit 120 collates the relationship between the one piece of state data and another piece of state data input immediately before the one piece of data is input with the normal model and determines whether or not the collated relationship is appropriate.

Furthermore, the abnormal sequence detection device 101 is able to continuously perform the detection process even after detecting abnormality once. The reason for that is because the determination unit 120 is able to prepare for performing the determination process from the beginning after detecting the abnormality and to detect elements of the normal model appropriate for comparison with the data input first after the abnormality detection.

The abnormal sequence detection device according to this exemplary embodiment is able to process any observation information if only the observation information has regularity in a sequence of observed data. In the case where the abnormal sequence detection device of this exemplary embodiment detects abnormality, the device detects a security incident caused by an attack on a system or a breakdown of a physical system to be monitored. Moreover, the abnormal sequence detection device of this exemplary embodiment is able to cope with an insertion, deletion, and the like of seemingly normal state data, which is not detected by detection of statistical outliers.

Second Exemplary Embodiment

[Description of the Configuration]

Figure 6:
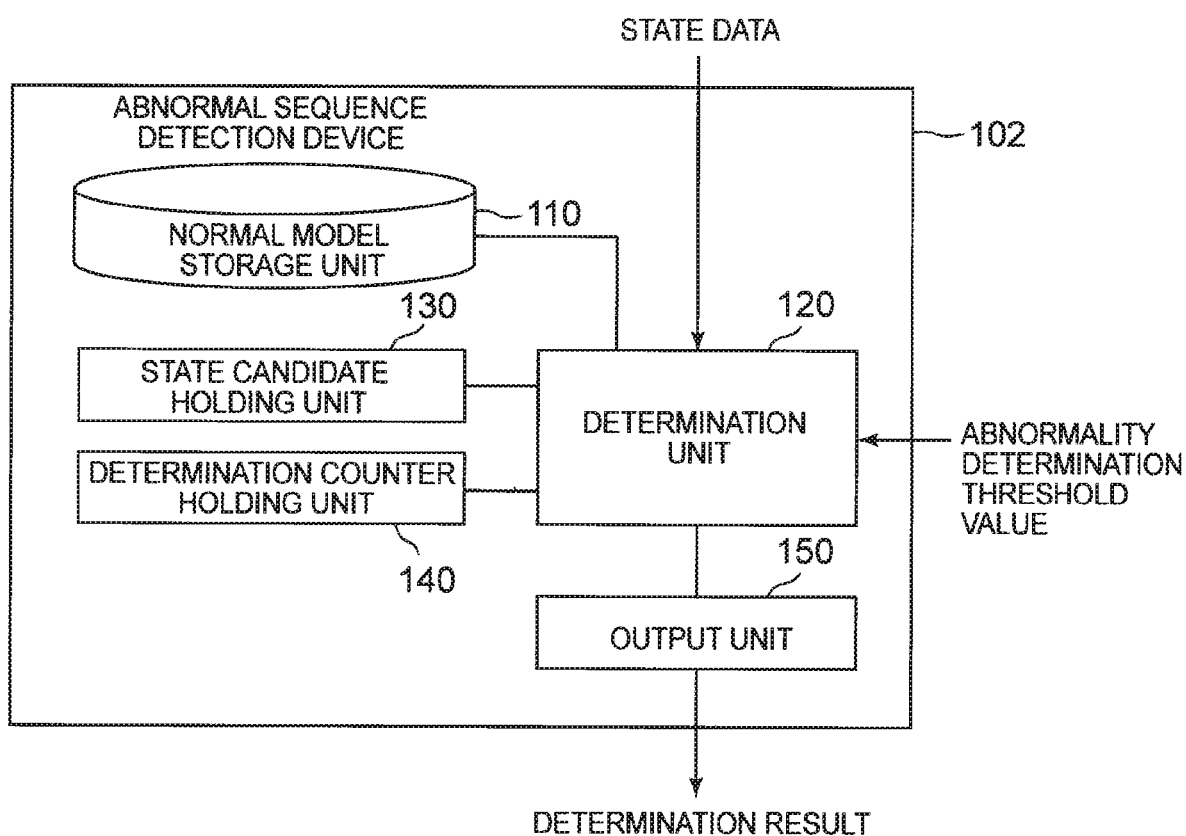
FIG. 6 is a block diagram showing a configuration example of a second exemplary embodiment of an abnormal sequence detection device 102 according to the present invention.

Subsequently, a second exemplary embodiment of the present invention will be described with reference to appended drawings. FIG. 6 is a block diagram showing a configuration example of a second exemplary embodiment of an abnormal sequence detection device 102 according to the present invention. The abnormal sequence detection device 102 of this exemplary embodiment corresponds to a normal detection device.

The configuration of the abnormal sequence detection device 102 of this exemplary embodiment is the same as the configuration of the abnormal sequence detection device 101 of the first exemplary embodiment.

The abnormal sequence detection device 101 of the first exemplary embodiment determined the control sequence as "normal" if the value of the determination counter is equal to or greater than the normality determination threshold value. The abnormal sequence detection device 102 of this exemplary embodiment determines the control sequence as "abnormal" if the value of the determination counter is equal to or greater than the abnormality determination threshold value.

As shown in FIG. 6, the determination unit 120 of this exemplary embodiment accepts an input of an abnormality determination threshold value. The determination unit 120 determines the control sequence, in which state data is observed in an unexpected sequence continuously by the specified number as an abnormality determination threshold value, as "abnormal."

[Description of Action]

Figure 7:
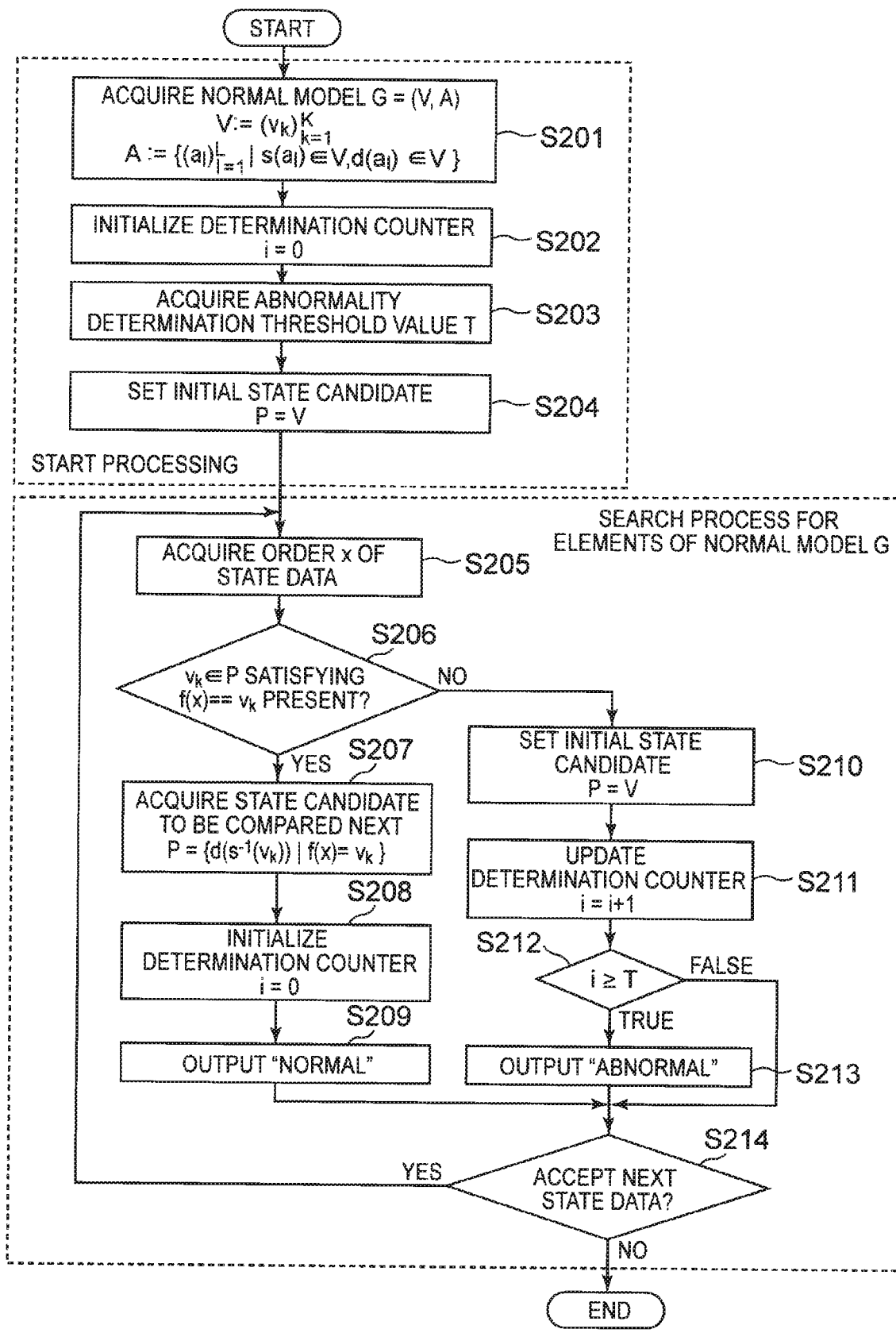
FIG. 7 is a flowchart showing an action of a control sequence determination process performed by the abnormal sequence detection device 102 of the second exemplary embodiment.

Hereinafter, description will be made on an action of determining whether the control sequence is normal or abnormal in the abnormal sequence detection device 102 shown in FIG. 6 with reference to FIG. 7. FIG. 7 is a flowchart showing an action of a control sequence determination process performed by the abnormal sequence detection device 102 of the second exemplary embodiment.

Figure 5:
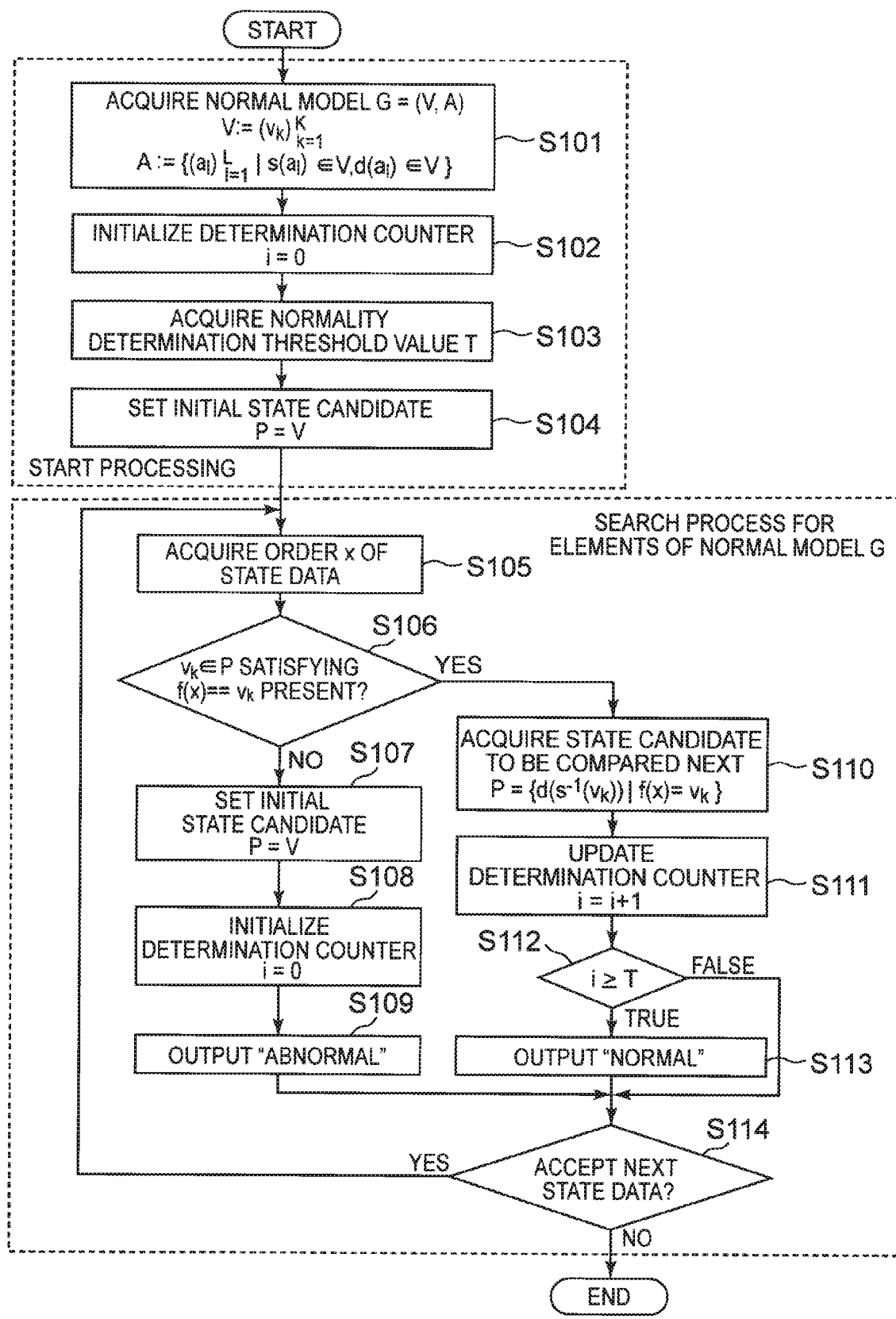
FIG. 5 is a flowchart showing an action of a control sequence determination process performed by the abnormal sequence detection device 101 of the first exemplary embodiment.

The processes of steps S201 to S202 are the same as those of steps S101 to S102 shown in FIG. 5.

Subsequently, the determination unit 120 acquires an abnormality determination threshold value T (step S203).

The processes of steps S204 to S206 are the same as those of steps S104 to S106 shown in FIG. 5.

If $v_k \in P$ is present (Yes in step S206), the determination unit 120 acquires a state candidate subsequently input (step S207). A method of acquiring the state candidate subsequently input is the same as the acquisition method in the process of step S110.

Subsequently, the determination unit 120 initializes the determination counter i held by the determination counter holding unit 140 to "0" (step S208). The determination unit 120 prepares for performing the determination process from the beginning by setting i to zero (i=0).

Subsequently, the output unit 150 outputs a determination result indicating that the control sequence is normal (step S209). After the output of the determination result, the determination unit 120 confirms whether to accept the next state data (step S214).

If the next state data is to be accepted (Yes in step S214), the determination unit 120 performs the process of step S205 again. Unless the next state data is to be accepted (No in step S214), the abnormal sequence detection device 102 ends the control sequence determination process.

Unless $v_k \in P$ is present (No in step S206), the determination unit 120 sets P held by the state candidate holding unit 130 to V again as an initial state candidate (step S210). The determination unit 120 prepares again for detecting normal state data from among all candidates by setting P=V.

Subsequently, the determination unit 120 increments by one the determination counter i held by the determination counter holding unit 140 (step S211). Subsequently, the determination unit 120 confirms whether or not the value of the determination counter i is equal to or greater than the abnormality determination threshold value T (step S212).

If the value of the determination counter i is less than the abnormality determination threshold value T (False in step S212), the determination unit 120 performs the process of step S214 described above.

If the value of the determination counter i is equal to or greater than the abnormality determination threshold value T (True in step S212), the output unit 150 outputs a determination result indicating that the control sequence is abnormal (step S213). After output of the determination result, the determination unit 120 performs the process of step S214 described above.

In the processes of steps S205 to S206, the determination unit 120 determines whether or not a pair of one piece of input data and another piece of data input immediately before the one piece of data is input is included in the normal model. If the pair is included in the normal model, the determination unit 120 determines that the system to be detected is placed in a normal state.

Figure 8:
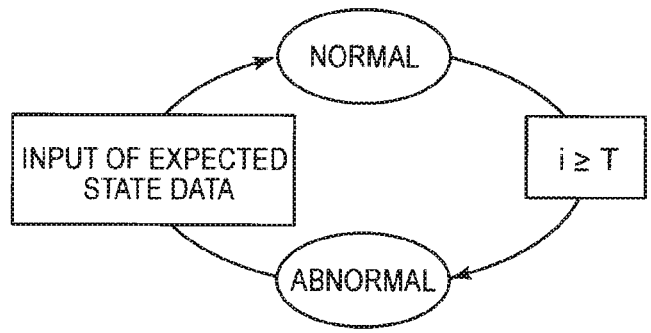
FIG. 8 is an explanatory diagram showing an example of a state transition of a determination result output from an abnormal sequence detection device 102.

There is shown in FIG. 8 an example of a state transition of a determination result, which is output from the abnormal sequence detection device 102 at the time of execution of the above control sequence determination process. FIG. 8 is an explanatory diagram showing the example of the state transition of the determination result output from an abnormal sequence detection device 102.

Specifically, if the value of the determination counter i is equal to or greater than the abnormality determination threshold value T, the output determination result indicates "abnormal." Moreover, in the case where expected state data is input to the abnormal sequence detection device 102 when a determination result indicating "abnormal" is output, an output determination result indicates "normal." Furthermore, in the case where the value of the determination counter i has reached the abnormality determination threshold value T again after the determination result indicating "normal" is output, an output determination result indicates "abnormal" again.

[Description of Advantageous Effects]

The abnormal sequence detection device 102 according to this exemplary embodiment is able to sequentially determine whether the control sequence having regularity in a sequence of included state data is normal or abnormal. Moreover, the abnormal sequence detection device 102 is able to detect the normal state immediately. The reason for that is because, every time one piece of state data is input, the determination unit 120 collates the relationship between the one piece of state data and another piece of state data input immediately before the one piece of data is input with the normal model and determines whether or not the collated relationship is appropriate.

Third Exemplary Embodiment

[Description of the Configuration]

Figure 9:
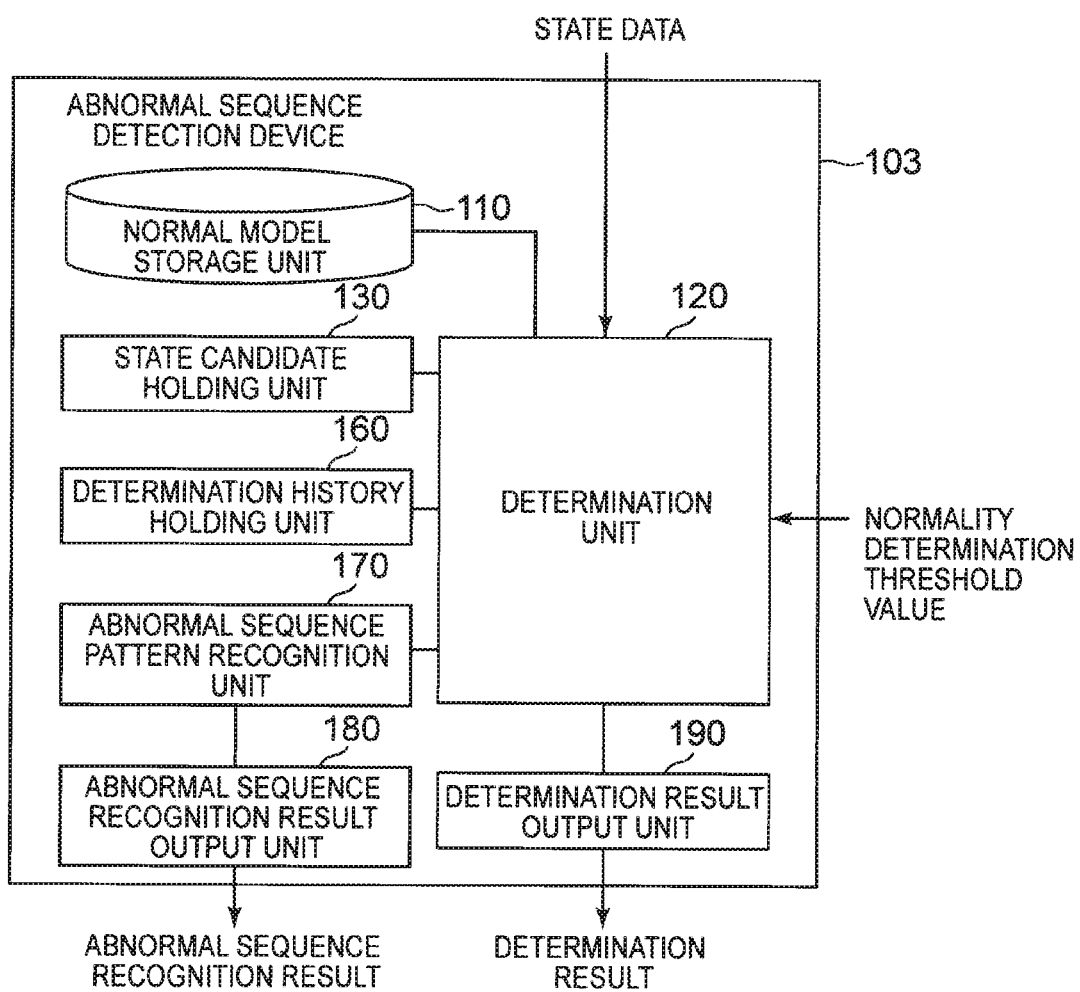
FIG. 9 is a block diagram showing a configuration example of a third exemplary embodiment of an abnormal sequence detection device 103 according to the present invention.

Subsequently, a third exemplary embodiment of the present invention will be described with reference to appended drawings. FIG. 9 is a block diagram showing a configuration example of a third exemplary embodiment of an abnormal sequence detection device 103 according to the present invention.

The abnormal sequence detection device 103 of this exemplary embodiment extracts a control sequence including abnormal state data that has been held since the determination result indicating abnormality is output until a determination result indicating normality is output.

Specifically, the abnormal sequence detection device 103 extracts a control sequence including abnormal state data that has been held since the determination counter is initialized to "0" until the determination counter indicates a value equal to or greater than the normality determination threshold value.

The abnormal sequence detection device 103 recognizes an abnormal pattern in the extracted control sequence. The abnormal pattern in the control sequence is, for example, falsification, insertion, deletion, or order change described above.

As shown in FIG. 9, the abnormal sequence detection device 103 includes a normal model storage unit 110, a determination unit 120, a state candidate holding unit 130, a determination history holding unit 160, an abnormal sequence pattern recognition unit 170, an abnormal sequence recognition result output unit 180, and a determination result output unit 190.

The components of the normal model storage unit 110, the determination unit 120, and the state candidate holding unit 130 of this exemplary embodiment are the same as those of the first exemplary embodiment. Moreover, the functions of the determination result output unit 190 are the same as the functions of the output unit 150 of the first exemplary embodiment.

The determination history holding unit 160 has a function of holding a prescribed number of histories of the determined state data. Moreover, the determination history holding unit 160 holds the determination counter of the first exemplary embodiment.

The abnormal sequence pattern recognition unit 170 has a function of recognizing an abnormal pattern by extracting a control sequence including abnormality. The abnormal sequence pattern recognition unit 170 recognizes which abnormal pattern related to the order the abnormality included in the extracted control sequence falls under, by using, for example, a Levenshtein distance (edit distance). The abnormal sequence pattern recognition unit 170 performs the abnormal sequence pattern recognition process independently of the control sequence determination process performed by the determination unit 120.

The abnormal sequence recognition result output unit 180 has a function of outputting an abnormal sequence recognition result from the abnormal sequence pattern recognition unit 170. The output abnormal sequence recognition result indicates a recognized abnormal pattern.

[Description of Action]

Hereinafter, an action of the abnormal sequence detection device 103 shown in FIG. 9 will be described with reference to FIGS. 10 to 11, and 16.

Figure 10:
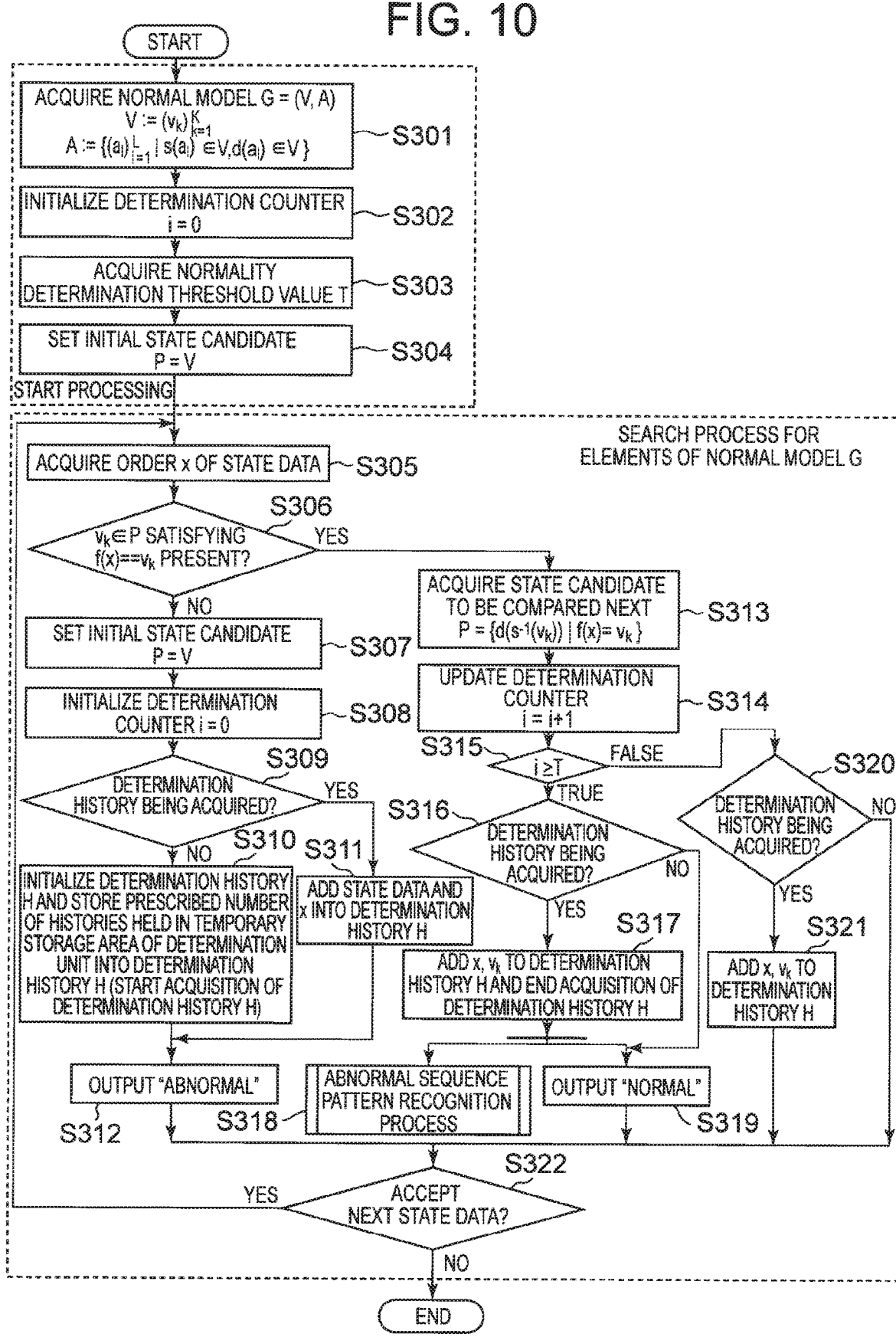
FIG. 10 is a flowchart showing an action of a control sequence determination process performed by an abnormal sequence detection device 103 of a third exemplary embodiment.

First, description is made on an action of determining whether the control sequence is normal or abnormal in the abnormal sequence detection device 103 shown in FIG. 9 with reference to FIG. 10. FIG. 10 is a flowchart showing an action of a control sequence determination process performed by the abnormal sequence detection device 103 of the third exemplary embodiment.

The processes of steps S301 to S308 are the same as processes of steps S101 to S108 shown in FIG. 5.

Subsequently, the determination unit 120 confirms whether or not the determination history is being acquired (step S309). If the determination history is being acquired (Yes in step S309), the determination unit 120 adds state data x acquired in step S305 and state data to a determination history H (step S311). The determination history H is held by the determination history holding unit 160.

Unless the determination history is being acquired (No in step S309), the determination unit 120 starts acquisition of the determination history H (step S310). Specifically, the determination unit 120 initializes the determination history H and stores a prescribed number of histories of determined state data and state data x, which are held in a temporary storage area of the determination unit 120 into the determination history H.

The processes of steps S312 to S315 are the same as those of steps S109 to S112 shown in FIG. 5.

If the value of the determination counter i is equal to or greater than the normality determination threshold value T (True in step S315), the determination unit 120 confirms whether or not the determination history is being acquired (step S316). If the determination history is being acquired (Yes in step S316), the determination unit 120 adds state data x acquired in step S305 and $v_k$ satisfying $f(x)=v_k$ to the determination history H. After the addition, the determination unit 120 ends the acquisition of the determination history H (step S317).

Subsequently, the abnormal sequence pattern recognition unit 170 performs the abnormal sequence pattern recognition process (step S318). In addition, the determination result output unit 190 outputs a determination result indicating that the control sequence is normal (step S319). As described above, the process of step S318 is performed in parallel with the process of step S319.

Unless the determination history is being acquired (No in step S316), the determination result output unit 190 outputs a determination result indicating that the control sequence is normal (step S319). After the output of the determination result, the determination unit 120 performs the process of step S322. The process of step S322 is the same as the process of step S114 shown in FIG. 5.

If the value of the determination counter i is less than the normality determination threshold value T (False in step S315), the determination unit 120 confirms whether or not the determination history is being acquired (step S320). Unless the determination history is being acquired (No in step S320), the determination unit 120 performs the process of step S322.

If the determination history is being acquired (Yes in step S320), the determination unit 120 adds the state data x acquired in step S305 and $v_k$ satisfying $f(x)=v_k$ to the determination history H (step S321). After the addition, the determination unit 120 performs the process of step S322.

Subsequently, description is made on an action of recognizing an abnormal pattern of an abnormal sequence by the abnormal sequence pattern recognition unit 170 in step S318 shown in FIG. 10 with reference to FIG. 11. FIG. 11 is a flowchart showing an action of an abnormal sequence pattern recognition process performed by the abnormal sequence pattern recognition unit 170 of the third exemplary embodiment.

Accepting an input of the determination history H including an abnormal sequence, the abnormal sequence pattern recognition unit 170 starts to perform the abnormal sequence pattern recognition process. The abnormal sequence pattern recognition process is performed independently of the control sequence determination process.

The abnormal sequence pattern recognition unit 170 extracts an abnormal sequence and a normal sequence from the input determination history H (step S401). The extracted abnormal sequence is a set of pieces of state data. Moreover, the extracted normal sequence is a set of $v_k$.

Subsequently, the abnormal sequence pattern recognition unit 170 performs computation processing of a Levenshtein distance (edit distance) on the basis of the extracted abnormal sequence and normal sequence (step S402). The computation processing of the Levenshtein distance is performed in the method described in NPL 1, for example.

Subsequently, the abnormal sequence pattern recognition unit 170 derives the Levenshtein distance with reference to a distance (cost) array and an operation history array, which are generated in performing the computation processing of the Levenshtein distance.

The abnormal sequence pattern recognition unit 170 then recognizes the abnormal pattern on the basis of the derived Levenshtein distance (step S403). After recognizing the abnormal pattern, the abnormal sequence pattern recognition unit 170 ends the abnormal sequence pattern recognition process.

Hereinafter, description is made on an example of Levenshtein distance computation performed by the abnormal sequence pattern recognition unit 170 in each abnormal pattern with reference to FIGS. 12 to 15. FIG. 12 is an explanatory diagram showing an example of Levenshtein distance computation performed by the abnormal sequence pattern recognition unit 170.

FIG. 12 shows an example of computation in the case where the abnormal pattern is <falsification>. If the abnormal pattern is <falsification>, the distance array and the operation history array as shown in FIG. 12 are generated in the process of step S402.

The abnormal sequence pattern recognition unit 170 decides a route that minimizes editing cost when normal labels in the column direction (in other words, elements of the normal model) are compared with abnormal labels in the row direction (in other words, elements of the abnormal sequence) in the distance array. In the example shown in FIG. 12, a route composed of rectangles each having a number in parentheses inside is the route minimizing the editing cost. The abnormal sequence pattern recognition unit 170 also applies the decided route minimizing the editing cost to the operation history array.

The edit distance has a value of the final point in the distance array, in other words, a value in the rectangle with (5) inside. Therefore, the edit distance is "1."

Furthermore, the operation is the same as one described as the route minimizing the editing cost in the operation history array. In the example shown in FIG. 12, the operation history in the route corresponds to "M→S→M→M." M, however, is an operation of confirming that one compared character coincides with another, and therefore is not included in an extraction target. Therefore, the operation corresponds to "one-time S (substitution)."

Figure 13:
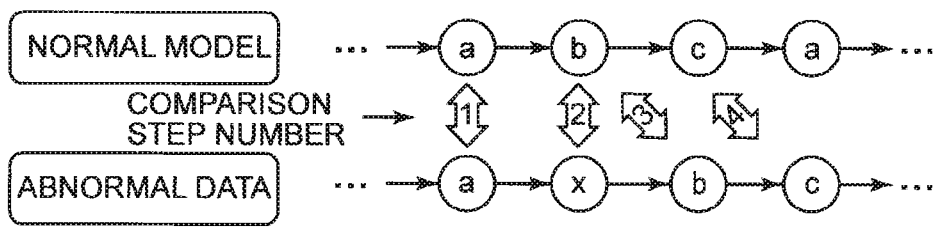
FIG. 13 is an explanatory diagram showing another example of Levenshtein distance computation performed by the abnormal sequence pattern recognition unit 170.

FIG. 13 is an explanatory diagram showing another example of Levenshtein distance computation performed by the abnormal sequence pattern recognition unit 170. FIG. 13 shows an example of computation in the case where the abnormal pattern is <insertion>. If the abnormal pattern is <insertion>, the distance array and the operation history array as shown in FIG. 13 are generated in the process of step S402.

The edit distance has a value of the final point in the distance array, in other words, a value in the rectangle with (6) inside. Therefore, the edit distance has a value of "2." In addition, the operation history in the route minimizing the editing cost corresponds to "M→I→M→M→D." Thus, the operation is "one-time I (insertion) in the middle and one-time D (deletion) at the end."

Figure 14:
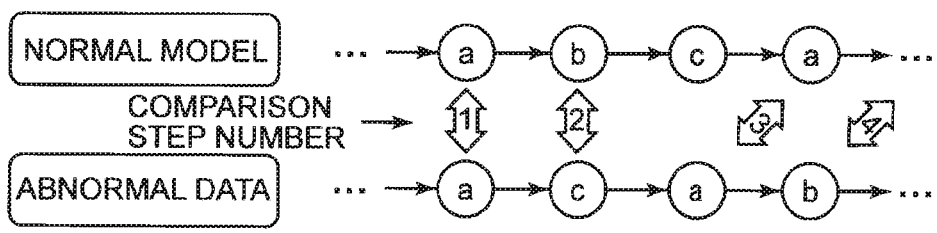
FIG. 14 is an explanatory diagram showing still another example of Levenshtein distance computation performed by the abnormal sequence pattern recognition unit 170.

FIG. 14 is an explanatory diagram showing still another example of Levenshtein distance computation performed by the abnormal sequence pattern recognition unit 170. FIG. 14 shows an example of computation in the case where the abnormal pattern is <deletion>. If the abnormal pattern is <deletion>, a distance array and an operation history array as shown in FIG. 14 are generated in the process of step S402.

The edit distance has a value of the final point in the distance array, in other words, a value in the rectangle with (6) inside. Therefore, the edit distance has a value of "2." In addition, the operation history in the route minimizing the editing cost corresponds to "M→D→M→M→I." Thus, the operation is "one-time D (deletion) in the middle and one-time I (insertion) at the end."

FIG. 15 is an explanatory diagram showing further another example of Levenshtein distance computation performed by the abnormal sequence pattern recognition unit 170. FIG. 15 shows an example of computation in the case where the abnormal pattern is <order change>. If the abnormal pattern is <order change>, a distance array and an operation history array as shown in FIG. 15 are generated in the process of step S402.

The edit distance has a value of the final point in the distance array, in other words, a value in the rectangle with (5/6) inside. Therefore, the edit distance has a value of "2." In addition, the operation history in the route minimizing the editing cost corresponds to "M→S→SID→M," "M→I→M→SID→M," or "M→D→M→SID→M."

In the rectangle with "SID" inside, any one of the S, I, and D operations may be selected. Therefore, the operation is, for example, "two-time S (substitution)" or "one-time I (insertion) and one-time D (deletion)."

A concrete example of the abnormal sequence pattern recognition process performed by the abnormal sequence pattern recognition unit 170 shown in FIG. 11 based on the above computation example will be described with reference to FIG. 16. FIG. 16 is a flowchart showing a concrete action of an abnormal sequence pattern recognition process performed by the abnormal sequence pattern recognition unit 170 of the third exemplary embodiment.

Figure 11:
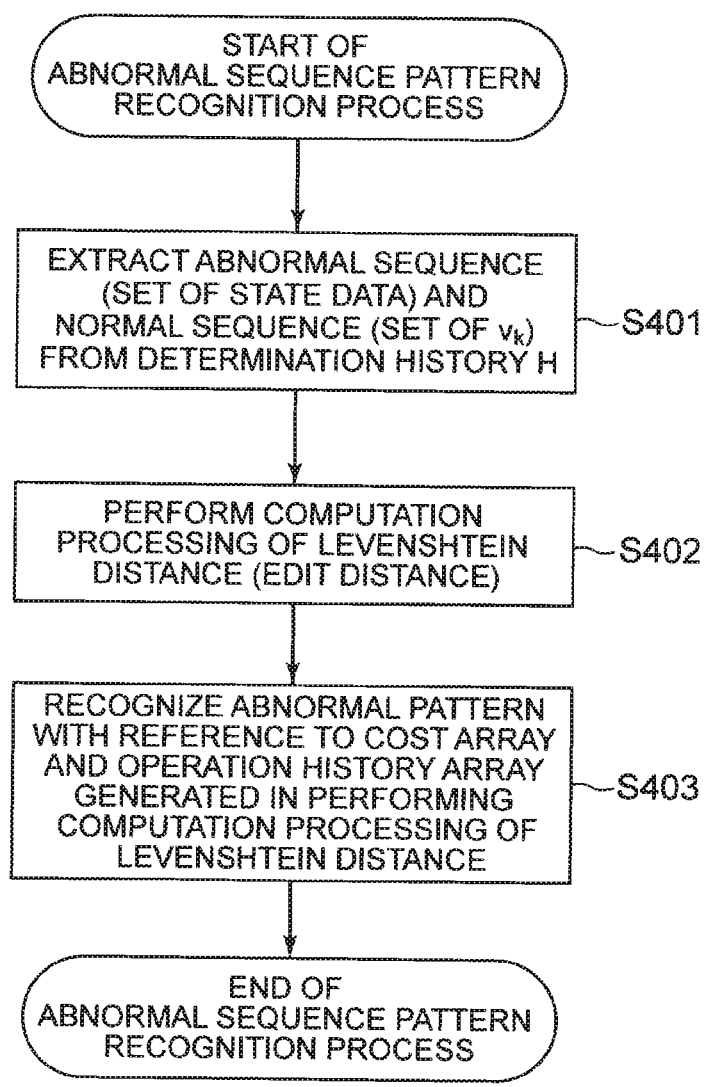
FIG. 11 is a flowchart showing an action of an abnormal sequence pattern recognition process performed by an abnormal sequence pattern recognition unit 170 of the third exemplary embodiment.

The processes of steps S411 to S412 are the same as those of steps S401 to 402 shown in FIG. 11.

Subsequently, the abnormal sequence pattern recognition unit 170 confirms the Levenshtein distance and operation computed in step S412 (step S413).

If the computed Levenshtein distance and operation are "distance=1, one-time substitution" ([distance=1, one-time substitution] in step S413), the abnormal sequence pattern recognition unit 170 recognizes that the abnormal pattern is falsification (step S414).

If the computed Levenshtein distance and operation are "distance=2, one-time insertion and one-time deletion at the end" ([distance=2, one-time insertion and one-time deletion at the end] in step S413), the abnormal sequence pattern recognition unit 170 recognizes that the abnormal pattern is insertion (step S415).

If the computed Levenshtein distance and operation are "distance=2, one-time deletion and one-time insertion at the end" ([distance=2, one-time deletion and one-time insertion at the end] in step S413), the abnormal sequence pattern recognition unit 170 recognizes that the abnormal pattern is deletion (step S416).

If the computed Levenshtein distance and operation are "distance=2, two-time substitution" or "distance=2, one-time insertion and one-time deletion" ([distance=2, two-time substitution or one-time insertion and one-time deletion] in step S413), the abnormal sequence pattern recognition unit 170 recognizes that the abnormal pattern is order change (step S417).

After recognizing the abnormal pattern, the abnormal sequence pattern recognition unit 170 outputs a recognition result of the abnormal pattern (step S418). After the output, the abnormal sequence pattern recognition unit 170 ends the abnormal sequence pattern recognition process. The output recognition result of the abnormal pattern is input to the abnormal sequence recognition result output unit 180.

[Description of Advantageous Effects]

The abnormal sequence detection device 103 of this exemplary embodiment is able to recognize an incorrect pattern in the control sequence. In measures against cyber-attacks causing serious incidents, early detection of an attack is important. In order to detect the attack early, it is required to recognize an abnormal pattern correctly. In other words, the abnormal sequence detection device 103 of this exemplary embodiment is likely to be suitably used for measures against cyberattacks.

As described above, the types of the state data constituting the control sequence of each exemplary embodiment include a control command, sensor information, log information, and the like.

The types of data constituting the state data may be temporal data, which has been obtained by computing a difference between two timestamps or may be a set of an IP (Internet protocol) address and a MAC (media access control) address.

Furthermore, the types of data constituting the state data may be a set of binary and control parameter constituting a control command or may be a set of a position, which is represented by latitude/longitude or coordinates such as Cartesian coordinates, polar coordinates, or the like, and an angle.

Furthermore, the types of data constituting the state data may be a set of temperature and humidity, a set of voltage, electric current, electric power, and magnetic field, or may be a set of wavelength (frequency) and light intensity.

Moreover, the types of data constituting the state data may be a set of distance, speed, acceleration, rotational speed, and angular velocity or may be a set of pressure, volume, and density.

Besides the above examples, a combination of various types of data is arbitrarily set for the types of data constituting state data according to the control system to be processed. The types of data constituting the state data may be previously described in a manual of the control system, a procedure manual thereof, specifications thereof, or the like.

In addition, the abnormal sequence detection devices 101 to 103 according to the respective exemplary embodiments are implemented by a central processing unit (CPU) that performs processes according to a program stored in a non-transitory storage medium, for example. Specifically, the determination unit 120, the state candidate holding unit 130, the determination counter holding unit 140, the output unit 150, the determination history holding unit 160, the abnormal sequence pattern recognition unit 170, the abnormal sequence recognition result output unit 180, and the determination result output unit 190 are implemented by the CPU that performs processes according to program control, for example. Furthermore, the abnormal sequence detection devices 101 to 103 may be implemented by a processor other than the CPU such as a graphics processing unit (GPU).

Moreover, the normal model storage unit 110 is implemented by a random access memory (RAM), for example.

Furthermore, the respective units of the abnormal sequence detection devices 101 to 103 of the respective exemplary embodiments may be implemented by hardware circuits. For example, the normal model storage unit 110, the determination unit 120, the state candidate holding unit 130, the determination counter holding unit 140, the output unit 150, the determination history holding unit 160, the abnormal sequence pattern recognition unit 170, the abnormal sequence recognition result output unit 180, and the determination result output unit 190 are each implemented by large scale integration (LSI). Alternatively, these units may be implemented by a single LSI.

Figure 17:
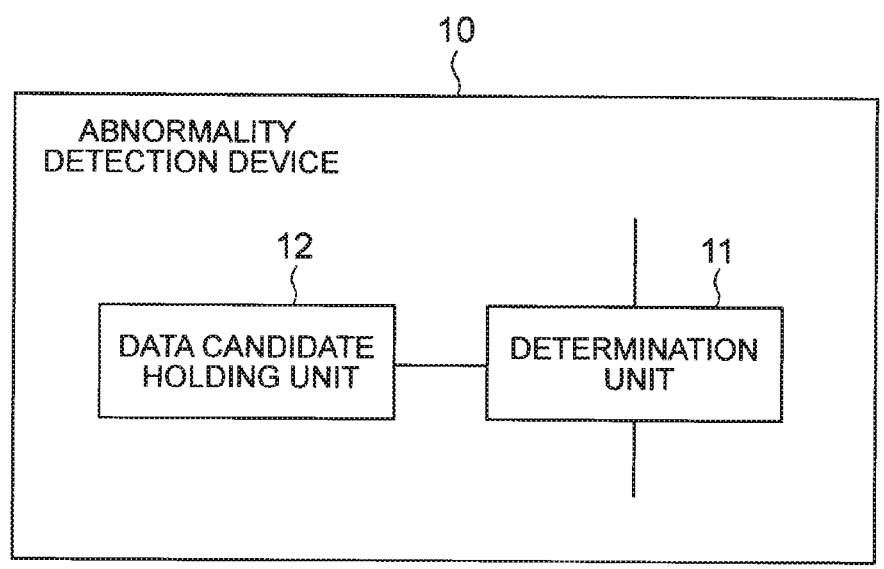
FIG. 17 is a block diagram showing an outline of an abnormality detection device according to the present invention.
Figure 19:
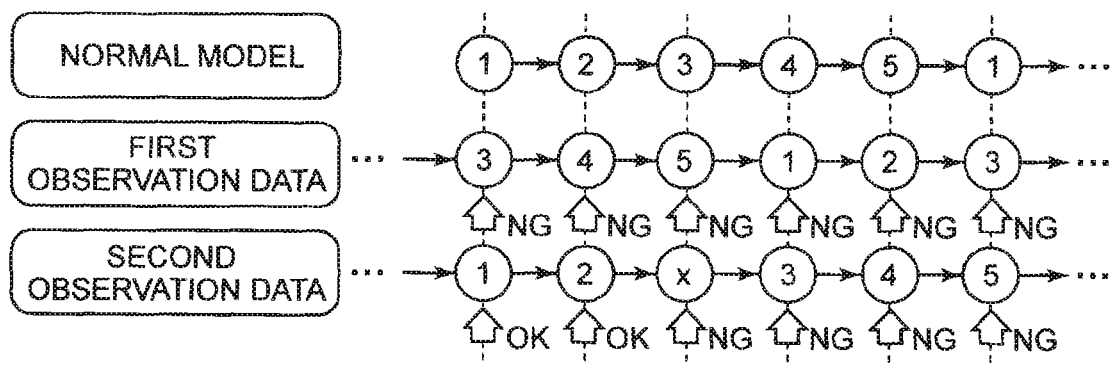
FIG. 19 is an explanatory diagram showing an example of performing abnormality determination.
Figure 20:
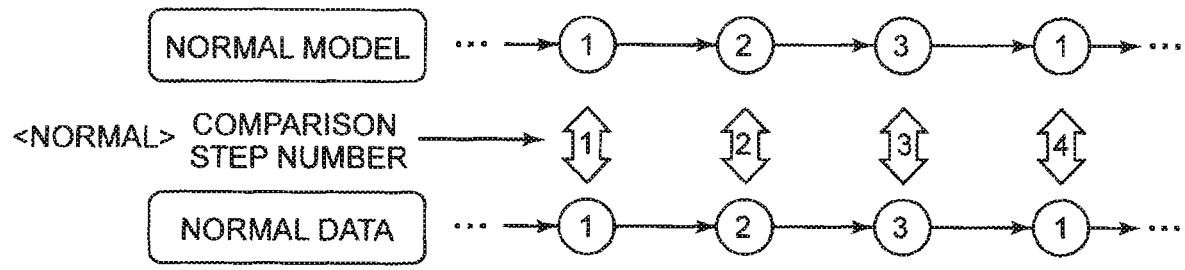
FIG. 20 is an explanatory diagram showing an example of a comparison method between a normal model and normal data.
Figure 21:
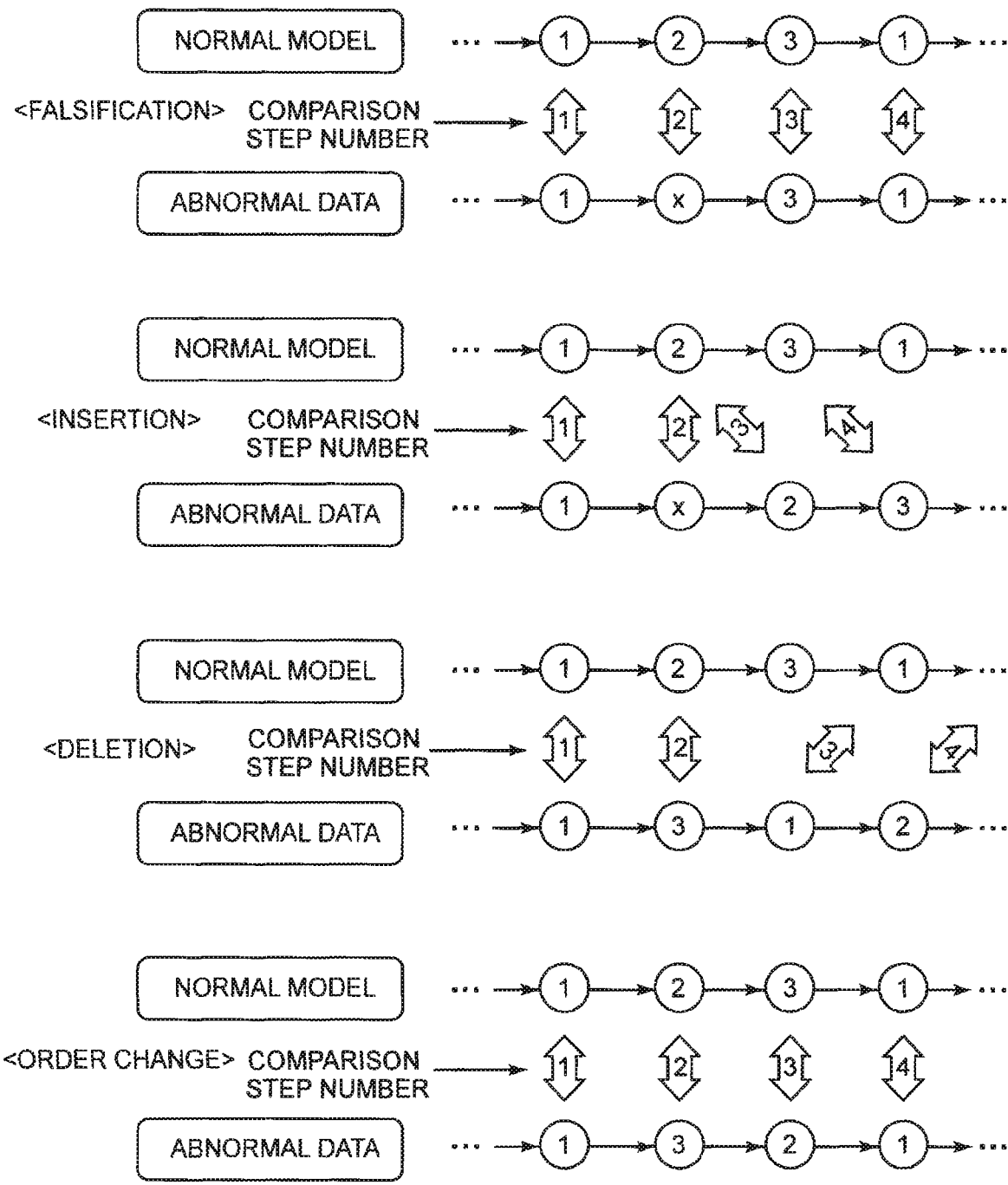
FIG. 21 is an explanatory diagram showing an example of a comparison method between a normal model and abnormal data.

Subsequently, the outline of the present invention will be described. FIG. 17 is a block diagram showing an outline of an abnormality detection device according to the present invention. The abnormality detection device 10 according to the present invention, which detects an abnormality of a data series to be detected that has regularity in a sequence of data forming the data series, is provided with: a determination unit 11 (for example, the determination unit 120) which refers to a data series of a normal model composed of a prescribed permutation as a data series that indicates a state in which a system to be detected is normal, and which, every time one piece of data is input, in light of a permutation indicated by a pair of the one piece of input data and another piece of data input immediately before the one piece of data is input, determines that the data series to be detected is locally abnormal when the permutation is not included in the normal model, and determines that the data series to be detected is locally normal when the permutation is included in the normal model; and a data candidate holding unit 12 (for example, the state candidate holding unit 130) which holds at least one or more data candidates of the normal model, which are predicted to be subsequently input to the determination unit 11, when the determination unit 11 determines that the data series to be detected is locally normal.

According to the above configuration, the abnormality detection device is able to immediately detect whether or not the permutation of the state data included in the control sequence deviates from the normal model.

Furthermore, the abnormality detection device 10 may include a determination counter holding unit (for example, the determination counter holding unit 140) that holds the number of normalities, which is the number of times that the determination unit 11 sequentially determined that the input data is locally normal, and the determination unit 11 may determine that the system to be detected is in a normal state when the number of normalities held by the determination counter holding unit is equal to or greater than a first prescribed value.

According to the above configuration, the abnormality detection device is able to determine a control sequence, in which a normality determination threshold value or more state data is arranged along a normal model, as normal information.

Furthermore, the determination counter holding unit may hold the number of abnormalities, which is the number of times that the determination unit 11 sequentially determined that the input data is locally abnormal and the determination unit 11 may determine that the system to be detected is in an abnormal state when the number of abnormalities held by the determination counter holding unit is equal to or greater than a second prescribed value.

According to the above configuration, the abnormality detection device is able to determine a control sequence, in which an abnormality determination threshold value or more state data is not arranged along the normal model, as abnormal information.

Furthermore, the first and second prescribed values may be operating parameters of the abnormality detection device 10 and further may be input parameters to the abnormality detection device 10.

Moreover, the abnormality detection device 10 may include: a determination history holding unit (for example, the determination history holding unit 160) that holds data of the normal model, which the determination unit 11 referred to in order to determine that the input data is locally abnormal or locally normal, and the input data by a prescribed number of pieces of data as historical data; and an abnormal pattern recognition unit (for example, the abnormal sequence pattern recognition unit 170) that extracts the data series to be detected including data determined to be locally abnormal by the determination unit 11 and the data series of the normal model used for comparison with the data series to be detected from the determination history holding unit and that recognizes an abnormal pattern related to the sequence of the data series to be detected, when the system to be detected is determined to be in an abnormal state.

Moreover, the abnormal pattern recognition unit may perform Levenshtein distance computation processing for the data series to be detected including the data determined to be locally abnormal and extracted from the determination history holding unit and the data series of the normal model used for the comparison with the data series to be detected and may recognize the abnormal pattern related to the sequence of the data series to be detected according to a cost array and an operation history array that have been generated.

According to the above configuration, the abnormality detection device is able to recognize the type of the permutation of a portion in which the state data is not arranged along the normal model in the control sequence.

Moreover, a label or number for identifying the order of appearance in the normal model is given to individual pieces of data forming the data series of the normal model and individual pieces of data may be formed as a multi-dimensional vector including data items represented by a plurality of actual values or discrete values.

Furthermore, the data items may include a timestamp for deciding the order of appearance in the normal model or time data corresponding to a difference between two timestamps.

According to the above configuration, the abnormality detection device is able to process a control sequence including state data corresponding to various types of detection data.

Furthermore, the prescribed sequence may be a circular permutation.

According to the above configuration, the abnormality detection device is able to process a control sequence including state data that has repeatedly appeared according to prescribed rules.

INDUSTRIAL APPLICABILITY

The present invention is preferably applied to technical territories of an IoT system and a communication network security. Moreover, the present invention is preferably applied to uses for monitoring cyberattacks on industrial control systems.

REFERENCE SIGNS LIST

10 Abnormality detection device
11 Determination unit
12 Data candidate holding unit
101 to 103 Abnormal sequence detection device
110 Normal model storage unit
120 Determination unit
130 State candidate holding unit
140 Determination counter holding unit
150 Output unit
160 Determination history holding unit
170 Abnormal sequence pattern recognition unit
180 Abnormal sequence recognition result output unit
190 Determination result output unit

The invention claimed is:

1. An abnormality detection device, which detects an abnormality of a data series to be detected that has regularity in a sequence of data forming the data series, the abnormality detection device comprising:
a processor; and
a memory storing executable instructions that, when executed by the processor, causes the processor to perform as:
a determination unit which refers to a data series of a normal model composed of a prescribed permutation as a data series that indicates a state in which a system to be detected is normal, and which, every time one piece of data is input, in light of a permutation indicated by a pair of one piece of input data and another piece of data input immediately before the one piece of data is input, determines that the data series to be detected is locally abnormal when the permutation is not included in the normal model, and determines that the data series to be detected is locally normal when the permutation is included in the normal model; and
a data candidate holding unit which holds at least one or more data candidates of the normal model, which are predicted to be subsequently input to the determination unit, when the determination unit determines that the data series to be detected is locally normal.

2. The abnormality detection device according to claim 1, wherein the processor further performs as a determination counter holding unit that holds the number of normalities, which is the number of times that the determination unit sequentially determined that the input data is locally normal, wherein the determination unit determines that the system to be detected is in a normal state when the number of normalities held by the determination counter holding unit is equal to or greater than a first prescribed value.

3. The abnormality detection device according to claim 2, wherein:
the determination counter holding unit holds the number of abnormalities, which is the number of times that the determination unit sequentially determined that the input data is locally abnormal; and
the determination unit determines that the system to be detected is in an abnormal state when the number of abnormalities held by the determination counter holding unit is equal to or greater than a second prescribed value.

4. The abnormality detection device according to claim 3, wherein the first and second prescribed values are operating parameters of the abnormality detection device and are input parameters to the abnormality detection device.

5. The abnormality detection device according to claim 1, wherein the processor further performs as:
a determination history holding unit that holds data of the normal model, which the determination unit referred to in order to determine that the input data is locally abnormal or locally normal, and the input data by a prescribed number of pieces of data as historical data;
an abnormal pattern recognition unit that extracts the data series to be detected including data determined to be locally abnormal by the determination unit and the data series of the normal model used for comparison with the data series to be detected from the determination history holding unit and that recognizes an abnormal pattern related to the sequence of the data series to be detected, when the system to be detected is determined to be in an abnormal state.

6. The abnormality detection device according to claim 5, wherein the abnormal pattern recognition unit performs Levenshtein distance computation processing for the data series to be detected including the data determined to be locally abnormal and extracted from the determination history holding unit and the data series of the normal model used for the comparison with the data series to be detected and then recognizes the abnormal pattern related to the sequence of the data series to be detected according to a cost array and an operation history array that have been generated.

7. The abnormality detection device according to claim 1, wherein:
a label or number for identifying the order of appearance in the normal model is given to individual pieces of data forming the data series of the normal model; and
individual pieces of data are formed as a multi-dimensional vector including data items represented by a plurality of actual values or discrete values.

8. The abnormality detection device according to claim 7, wherein the data items include a timestamp for deciding the order of appearance in the normal model or time data corresponding to a difference between two timestamps.

9. The abnormality detection device according to claim 1, wherein the prescribed sequence is a circular permutation.

10. An abnormality detection method, which is used to detect an abnormality of a data series to be detected that has regularity in a sequence of data forming the data series, the abnormality detection method comprising:
 referring to a data series of a normal model composed of a prescribed permutation as a data series that indicates a state in which a system to be detected is normal, and every time one piece of data is input, in light of a permutation indicated by a pair of the one piece of input data and another piece of data input immediately before the one piece of data is input, determining that the data series to be detected is locally abnormal when the permutation is not included in the normal model, and determining that the data series to be detected is locally normal when the permutation is included in the normal model; and
 holding at least one or more data candidates of the normal model, which are predicted to be subsequently input, when the data series to be detected is determined to be locally normal.

11. A non-transitory computer-readable recording medium having recorded therein an abnormality detection program, which is used to detect an abnormality of a data series to be detected that has regularity in a sequence of data forming the data series, the abnormality detection program being used for causing a computer to perform:
 a determination process of referring to a data series of a normal model composed of a prescribed permutation as a data series that indicates a state in which a system to be detected is normal, and every time one piece of data is input, in light of a permutation indicated by a pair of the one piece of input data and another piece of data input immediately before the one piece of data is input, determining that the data series to be detected is locally abnormal when the permutation is not included in the normal model, and determining that the data series to be detected is locally normal when the permutation is included in the normal model; and
 a holding process of holding at least one or more data candidates of the normal model, which are predicted to be subsequently input, when the data series to be detected is determined to be locally normal.

12. The abnormality detection device according to claim 2, wherein the processor further performs as:
 a determination history holding unit that holds data of the normal model, which the determination unit referred to in order to determine that the input data is locally abnormal or locally normal, and the input data by a prescribed number of pieces of data as historical data;
 an abnormal pattern recognition unit that extracts the data series to be detected including data determined to be locally abnormal by the determination unit and the data series of the normal model used for comparison with the data series to be detected from the determination history holding unit and that recognizes an abnormal pattern related to the sequence of the data series to be detected, when the system to be detected is determined to be in an abnormal state.

13. The abnormality detection device according to claim 3, wherein the processor further performs as:
 a determination history holding unit that holds data of the normal model, which the determination unit referred to in order to determine that the input data is locally abnormal or locally normal, and the input data by a prescribed number of pieces of data as historical data;
 an abnormal pattern recognition unit that extracts the data series to be detected including data determined to be locally abnormal by the determination unit and the data series of the normal model used for comparison with the data series to be detected from the determination history holding unit and that recognizes an abnormal pattern related to the sequence of the data series to be detected, when the system to be detected is determined to be in an abnormal state.

14. The abnormality detection device according to claim 4, wherein the processor further performs as:
 a determination history holding unit that holds data of the normal model, which the determination unit referred to in order to determine that the input data is locally abnormal or locally normal, and the input data by a prescribed number of pieces of data as historical data;
 an abnormal pattern recognition unit that extracts the data series to be detected including data determined to be locally abnormal by the determination unit and the data series of the normal model used for comparison with the data series to be detected from the determination history holding unit and that recognizes an abnormal pattern related to the sequence of the data series to be detected, when the system to be detected is determined to be in an abnormal state.

15. The abnormality detection device according to claim 12, wherein the abnormal pattern recognition unit performs Levenshtein distance computation processing for the data series to be detected including the data determined to be locally abnormal and extracted from the determination history holding unit and the data series of the normal model used for the comparison with the data series to be detected and then recognizes the abnormal pattern related to the sequence of the data series to be detected according to a cost array and an operation history array that have been generated.

16. The abnormality detection device according to claim 13, wherein the abnormal pattern recognition unit performs Levenshtein distance computation processing for the data series to be detected including the data determined to be locally abnormal and extracted from the determination history holding unit and the data series of the normal model used for the comparison with the data series to be detected and then recognizes the abnormal pattern related to the sequence of the data series to be detected according to a cost array and an operation history array that have been generated.

17. The abnormality detection device according to claim 14, wherein the abnormal pattern recognition unit performs Levenshtein distance computation processing for the data series to be detected including the data determined to be locally abnormal and extracted from the determination history holding unit and the data series of the normal model used for the comparison with the data series to be detected and then recognizes the abnormal pattern related to the sequence of the data series to be detected according to a cost array and an operation history array that have been generated.

18. The abnormality detection device according to claim 2, wherein:
 a label or number for identifying the order of appearance in the normal model is given to individual pieces of data forming the data series of the normal model; and
 individual pieces of data are formed as a multi-dimensional vector including data items represented by a plurality of actual values or discrete values.

19. The abnormality detection device according to claim 3, wherein:
 a label or number for identifying the order of appearance in the normal model is given to individual pieces of data forming the data series of the normal model; and individual pieces of data are formed as a multi-dimensional vector including data items represented by a plurality of actual values or discrete values.

20. The abnormality detection device according to claim 4, wherein:
   a label or number for identifying the order of appearance in the normal model is given to individual pieces of data forming the data series of the normal model; and
   individual pieces of data are formed as a multi-dimensional vector including data items represented by a plurality of actual values or discrete values.

* * * * *